US012782692B2

(12) United States Patent
Liu et al.

(10) Patent No.: US 12,782,692 B2
(45) Date of Patent: Nov. 3, 2026

(54) CAMERA OPTICAL LENS

(71) Applicant: AAC OPTICS (CHANGZHOU) CO., LTD., Changzhou (CN)

(72) Inventors: Weixiao Liu, Changzhou (CN); Shunda Zhou, Changzhou (CN)

(73) Assignee: AAG OPTICS (CHANGZHOU) CO., LTD., Changzhou (CN)

( * ) Notice: Subject to any disclaimer, the term of this patent is extended or adjusted under 35 U.S.C. 154(b) by 240 days.

(21) Appl. No.: 18/733,597

(22) Filed: Jun. 4, 2024

(65) Prior Publication Data

US 2025/0251573 A1 Aug. 7, 2025

(30) Foreign Application Priority Data

Feb. 7, 2024 (CN) ......................... 202410175525.2

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01); *G02B 13/006* (2013.01); *G02B 13/008* (2013.01)

(58) Field of Classification Search
CPC .............................. G02B 9/62; G02B 13/0045
See application file for complete search history.

(56) References Cited

U.S. PATENT DOCUMENTS

2023/0384559 A1* 11/2023 Emura ............... G02B 13/0045

* cited by examiner

*Primary Examiner* — Alexander P Gross
(74) *Attorney, Agent, or Firm* — Wiersch Law Group

(57) ABSTRACT

A camera optical lens includes in sequence from an object side to an image side: a first lens having a negative refractive power, a second lens, a third lens, a fourth lens, a fifth lens, and a sixth lens. The camera optical lens satisfies the following conditions: $-1.70 \leq f1/f \leq -1.40$; $0.11 < BF/TTL \leq 0.17$; $2.90 \leq (R3+R4)/(R3-R4) \leq 50$; and $nd3 \geq 1.70$, where f, TTL and BF represent a focal length, a total track length and a back focus length of the camera optical lens respectively; f1 represents a focal length of the first lens; R3 and R4 represent curvature radius of an object-side surface and an image-side surface of the second lens respectively; and nd3 represents a refractive index of the third lens. The camera optical lens has good optical performance, and can meet the design requirements of large aperture and ultra-wide angle, and the working band of the camera optical lens can cover visible and infrared light.

10 Claims, 12 Drawing Sheets

CAMERA OPTICAL LENS

CROSS REFERENCE TO RELATED APPLICATIONS

The present application claims the benefit of priority under the Paris Convention to Chinese Patent Application No. 202410175525.2 filed on Feb. 7, 2024, which is incorporated herein by reference in its entirety.

TECHNICAL FIELD

Embodiments of the present disclosure relate to the technical field of optics, and in particular to a camera optical lens.

BACKGROUND

With the development of intelligent driving, in-vehicle lens is also rapidly updated and iterated. An in-vehicle camera is favored by developers of autonomous driving technology because of its clear imaging effect. However, the in-vehicle camera is easily affected by environmental factors (such as strong light, rain and snow, etc.), which leads to poor shooting effect. Based on this, the use of an in-vehicle laser radar to supplement the information received by the in-vehicle lens is of great significance. The laser radar detects the target, obtains the target light wave signal from the reflected light, and processes the information together with the transmitted signal to obtain the distance, speed, azimuth and other information of the detected target. For the laser radar, the camera optical lens is an indispensable part of the laser radar. The camera optical lens can collimate the beam of the laser radar to improve the detection effect.

However, the existing camera optical lens of the laser radar still cannot meet the application requirements of large aperture, ultra-wide angle and wide range of working bands.

SUMMARY

Embodiments of the present disclosure provide a camera optical lens, which has hgood optical performance and can meet the design requirements of large aperture and ultra-wide angle. In addition, the working band of the camera optical lens can cover visible and infrared light to achieve day and night confocality of the camera optical lens of the in-vehicle laser radar.

In order to solve the above technical problems, a camera optical lens is provided according to the present disclosure, which includes in sequence from an object side to an image side: a first lens having a negative refractive power, a second lens, a third lens, a fourth lens, a fifth lens, and a sixth lens. The camera optical lens satisfies the following conditions: $-1.70 \leq f1/f \leq -1.40$, $0.11 \leq BF/TTL \leq 0.17$, $(R3+R4)/(R3-R4) \geq 2.90$, and $nd3 \geq 1.70$. f represents a focal length of the camera optical lens, f1 represents a focal length of the first lens, TTL represents a total track length of the camera optical lens, BF represents a back focal length of the camera optical lens, R3 represents a curvature radius of an object-side surface of the second lens, R4 represents a curvature radius of an image-side surface of the second lens, and nd3represents a refractive index of the third lens.

As an improvement, the camera optical lens further satisfies the following condition: $-1.60 \leq f4/f5 \leq -0.80$. f4 represents a focal length of the fourth lens, and f5 represents a focal length of the fifth lens.

As an improvement, the camera optical lens further satisfies the following condition: $0.80 \leq d11/d10 \leq 1.60$. d10 represents an on-axis distance from an image-side surface of the fifth lens to an object-side surface of the six lens, and d11 represents an on-axis thickness of the six lens.

As an improvement, the camera optical lens further satisfies the following condition: $2.90 \leq (R3+R4)/(R3-R4) \leq 50.00$.

As an improvement, an object-side surface of the first lens is convex in a paraxial region, and an image-side surface of the first lens is concave in the paraxial region, and the camera optical lens further satisfies the following condition: $0.60 \leq (R1+R2)/(R1-R2) \leq 2.00$, and $0.01 \leq d1/TTL \leq 1.00$. R1 represents a curvature radius of an object-side surface of the first lens, R2 represents a curvature radius of an image-side surface of the first lens, and d1 represents an on-axis thickness of the first lens.

As an improvement, the second lens has a negative refractive power, an object-side surface of the second lens is convex in a paraxial region, and an image-side surface of the second lens is concave in the paraxial region. The camera optical lens further satisfy the following condition: $-352.00 \leq f2/f \leq -7.00$, and $0.01 \leq d3/TTL \leq 0.06$. f2 represents a focal length of the second lens, and d3 represents an on-axis thickness of the second lens.

As an improvement, the third lens has a positive refractive power, an object-side surface of the third lens is convex in a paraxial region, and an image-side surface of the third lens is convex in the paraxial region. The camera optical lens further satisfies the following conditions: $0.40 \leq (R5+R6)/(R5-R6) \leq 1.50$; $0.75 \leq f3/f \leq 2.70$; and $0.05 \leq d5/TTL \leq 0.22$. R5 represents a curvature radius of the object-side surface of the third lens, R6 represents a curvature radius of the image-side surface of the third lens, f3 represents a focal length of the third lens, and d5 represents an on-axis thickness of the third lens.

As an improvement, the fourth lens has a positive refractive power, an object-side surface of the fourth lens is convex in a paraxial region, and an image-side surface of the fourth lens is convex in the paraxial region. The camera optical lens further satisfies the following conditions: $0.07 \leq (R7+R8)/(R7-R8) \leq 0.70$, $0.70 \leq f4/f \leq 3.00$; and $0.05 \leq d7/TTL \leq 0.30$. R7 represents a curvature radius of the object-side surface of the fourth lens, R8 represents a curvature radius of the image-side surface of the fourth lens, f4 represents a focal length of the fourth lens, and d7 represents an on-axis thickness of the fourth lens.

As an improvement, the fifth lens has a negative refractive power, an object-side surface of the fifth lens is concave in a paraxial region, and an image-side surface of the fifth lens is concave in the paraxial region. The camera optical lens further satisfies the following conditions: $-2.00 \leq (R9+R10)/(R9-R10) \leq -0.20$, $-5.00 \leq f5/f \leq -0.50$, and $0.01 \leq d9/TTL \leq 0.20$. R9 represents a curvature radius of the object-side surface of the fifth lens, R10 represents a curvature radius of the image-side surface of the fifth lens, f5 represents a focal length of the fifth lens, and d9 represents an on-axis thickness of the fifth lens.

As an improvement, the sixth lens has a positive refractive power, an object-side surface of the sixth lens is convex in a paraxial region, and an image-side surface of the sixth lens is concave in the paraxial region. The camera optical lens further satisfies the following conditions: $-7.50 \leq (R11+R12)/(R11-R12) \leq -1.00$, $0.60 \leq f6/f \leq 5.00$, and $0.01 \leq d11/TTL \leq 0.15$. R11 represents a curvature radius of the object-side surface of the sixth lens, R12 represents a curvature radius of the image-side surface of the sixth lens, f6 represents a focal length of the sixth lens, and d11 represents an on-axis thickness of the sixth lens.

As an improvement, the third lens is made of glass.

The present disclosure has the beneficial effects in that: by the configuration of the lens as described above, the camera optical lens according to the present disclosure has good optical performance and has the characteristics of large aperture and ultra-wide angle. In addition, the working band of the camera optical lens according to the present disclosure can cover visible and infrared light, and thus can achieve day and night confocality of the camera optical lens of the in-vehicle laser radar.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION OF THE EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

In the present disclosure embodiment, the terms "top," "bottom," "left," "right "front," "back," "top," "bottom," "inside," "outside," "center," "vertical," "horizontal," "transverse," "longitudinal," etc. that indicate the orientation or positional relationship are based on the orientation or positional relationship shown in the accompanying drawings. These terms are primarily intended to better describe the present disclosure and its embodiments, and are not intended to qualify that the indicated device, element, or component must have a particular orientation, or be constructed and operated in a particular orientation.

Moreover, some of the above terms may be used to indicate other meanings in addition to an orientation or positional relationship, for example, the term "on" may also be used to indicate a certain dependency or connection relationship in some cases. To a person of ordinary skill in the art, the specific meaning of these terms in the present disclosure may be understood according to the specific circumstances.

In addition, the terms "mount," "set," "provide," "open," "connect," "inter-connect" should be understood in a broad sense. For example, it may be a fixed connection, a removable connection, or a monolithic construction; it may be a mechanical connection, or an electrical connection; it may be a direct connection, or an indirect connection through an intermediate medium, or an internal connection between two devices, elements, or components. To a person of ordinary skill in the art, the specific meanings of the above terms in the present disclosure may be understood according to the specific circumstances.

In addition, the terms "first," "second," etc. are mainly used to distinguish different devices, elements or components (the specific types and configurations may be the same or different), and are not used to indicate or imply the relative importance and number of the indicated devices, elements or components. Unless otherwise indicated, "plurality" is used primarily to distinguish between different devices, elements or components (which may be of the same specific type and configuration). Unless otherwise indicated, "plurality" means two or more.

First Embodiment

Figure 1:
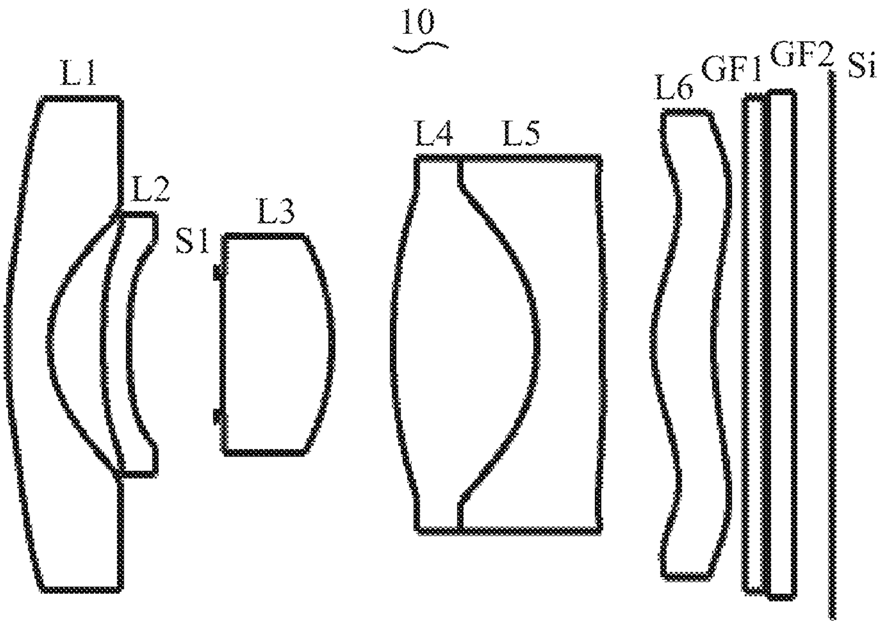
FIG. 1 is a schematic structural view of a camera optical lens according to a first embodiment of the present disclosure.

Referring to FIG. 1, a camera optical lens 10 is provided according to a first embodiment of the present disclosure, which includes in sequence from an object side to an image side: a first lens L1 having a negative refractive power, a second lens L2, a third lens L3, a fourth lens L4, a fifth lens L5, and a sixth lens L6.

Here, a focal length of the camera optical lens 10 is defined f, a focal length of the first lens L1 is defined f1, a total track length of the camera optical lens 10 is defined as TTL, a back focal length of the camera optical lens 10 is defined as BF, a curvature radius of an object-side surface of the second lens L2 is defined as R3, a curvature radius of an image-side surface of the second lens L2 is defined as R4, and a refractive index of the third lens L3 is defined as nd3. The camera optical lens 10 satisfies the following conditions:

$$-1.70 \le f1/f \le -1.40 \quad (1)$$

$$0.11 \le BF/TTL \le 0.17 \quad (2)$$

$$(R3+R4)/(R3-R4) \ge 2.90 \quad (3)$$

$$nd3 \ge 1.70 \quad (4)$$

The condition (1) specifies a ratio of the focal length f1 of the first lens L1 and the focal length f of the camera optical lens 10, and by setting the ratio in the range specified in the condition (1) to reasonably distribute of the optical focal length of the camera optical lens 10, the camera optical lens 10 is made to have a good sensitivity performance while satisfying the design of large aperture.

The condition (2) specifies a ratio of the back focal length BF of the camera optical lens 10 and the total track length TTL of the camera optical lens 10. The back focal length within the range defined by the condition (2) facilitates the assembly of the camera optical lens 10, makes the camera optical lens 10 compact, reduces the sensitivity of the lens to the modulation transfer function (MTF), improves the production yield and reduces the production cost.

The condition (3) specifies the shape of the second lens L2. Within the range defined by the condition (3), it is conducive to moderating the degree of deflection of light passing through the camera optical lens 10, so that the system has better imaging quality and lower sensitivity. Here, the system is the camera optical lens 10.

The condition (4) defines the refractive index of the third lens L3. Within the range defined by the condition (4), the degree of deflection of the light passing through the camera optical lens 10 can be moderated, and the chromatic aberration can be effectively corrected so that the chromatic aberration |LC| in the RGB band (visible light band) meets: |LC|≤8.0 microns.

In this embodiment, by setting the ratio of the focal length f1 of the first lens L1 to the focal length f of the camera optical lens 10, the ratio of the back focal length BF of the camera optical lens 10 to the total optical length TTL of the camera optical lens 10, the shape of the second lens L2 and the refractive index of the third lens L3, the camera optical lens 10 is made to have good optical performance and have the characteristics of large aperture and ultra-wide angle. In addition, the working waveband of the camera optical lens 10 of the present disclosure can cover both visible and infrared light, and can achieve day and night confocality of the camera optical lens of the in-vehicle laser radar.

It is to be noted that the back focal length BF of the camera optical lens 10 is an on-axis distance in millimetres from the image-side surface of the sixth lens L6 to the image surface Si of the camera optical lens 10.

Preferably, the refractive index n3 of the third lens L3 further satisfies the following condition:

$$nd3 \le 1.80 \quad (5)$$

The condition (5) further defines the refractive index of the third lens L3.

Preferably, the second lens L2 further satisfies the following condition:

$$2.90 \le (R3+R4)/(R3-R4) \le 50.00 \quad (6)$$

The condition (6) further defines the shape of the second lens L2.

Preferably, the image-side surface of the fourth lens LA and the object-side surface of the fifth lens L5 are glued together. In this way, the total track length TTL of the camera optical lens 10 can be reduced, which facilitates the miniaturization design of the camera optical lens 10.

Preferably, a focal length of the fourth lens L4 is defined as f4, and a focal length of the fifth lens L5 is defined f5. The following condition is satisfied:

$$-1.60 \le f4/f5 \le -0.80 \quad (7)$$

The condition (7) specifies a ratio of the focal length f4 of the fourth lens L4 to the focal length f5 of the fifth lens L5, and within the range specified in the condition (7), the proximity of the focal length f4 of the fourth lens L4 and the focal length f5 of the fifth lens L5 facilitates smooth transition of light, improving the imaging quality of the camera optical lens 10.

Preferably, an on-axis distance between the fifth lens L5 and the sixth lens L6 is defined as d10, an on-axis thickness of the sixth lens L6 is defined as d11 and the following condition is satisfied:

$$0.80 \le d11/d10 \le 1.60 \quad (8)$$

The condition (8) specifies the ratio of the on-axis thickness d11 of the sixth lens L6 to the on-axis distance d10 between the image-side surface of the fifth lens L5 and the object-side surface of the sixth lens L6, which, within the range specified in the condition (8), is beneficial to compressing the total track length TTL of the camera optical lens 10.

In this embodiment, the object-side surface of the first lens L1 is convex in a paraxial region, an image-side surface of the first lens L1 is concave in the paraxial region, and the first lens L1 has a negative refractive power. In other optional embodiments, the object-side surface and image-side surface of the first lens 1 may be configured in other concave and convex arrangements.

Preferably, a curvature radius of the object-side surface of the first lens L1 is defined as R1, a curvature radius of the image-side surface of the first lens L1 is defined as R2, an on-axis thickness of the first lens L1 is defined as d1, and the following conditions are satisfied:

$$0.60 \le (R1+R2)/(R1-R2) \le 2.00 \quad (9)$$

$$0.01 \le d1/TTL \le 1.00 \quad (10)$$

The condition (9) specifies the shape of the first lens L1 such that the first lens L1 is capable of efficiently correcting the system spherical aberration. More preferably, 1.01≤(R1+R2)/(R1−R2)≤1.59. The condition (10) specifies a value range of the ratio of the on-axis thickness d1 of the first lens L1 to the total track length TTL of the camera optical lens 10, which facilitates the realization of the ultra-thin design of the camera optical lens 10. More preferably, 0.04≤d1/TTL≤0.07.

In this embodiment, an object-side surface of the second lens L2 is convex in a paraxial region, an image-side surface of the second lens L2 is concave in the paraxial region, and the second lens L2 has a negative refractive power. In other optional embodiments, the object-side surface and image-side surface of the second lens L2 may be arranged in other concave and convex arrangements, and the second lens L2 may have a positive refractive power.

Preferably, a focal length of the second lens L2 is defined as f2, an on-axis thickness of the second lens L2 is defined as d3, and the following conditions are satisfied:

$$-352.00 \le f2/f \le -7.00 \quad (11)$$

$$0.01 \le d3/TTL \le 0.06 \quad (12)$$

The condition (11) specifies the ratio of the focal length of the second lens L2 to the overall focal length of the camera optical lens 10, and within the range limited by condition (11), the second lens L2 has an appropriate negative refractive power, which is conductive to the reduction of the system aberration and the development of the camera optical lens 10 towards ultra-thinness and wide-angle. More preferably, −219.00≤f2/f≤−8.44. The condition (12) specifies the on-axis thickness d3 of the second lens L1, which, within the range limited by the condition (12), facilitates the ultra-thinness design of the camera optical lens 10. More preferably, 0.02≤d3/TTL≤0.04.

In this embodiment, an object-side surface of the third lens L3 is convex in a paraxial region, an image-side surface of the third lens L3 is convex in the paraxial region, and the third lens L3 has a positive refractive power. In other optional embodiments, the object-side surface and image-side surface of the third lens L3 may be arranged in other concave and convex arrangements, and the third lens L3 may have a negative refractive power.

Preferably, a curvature radius of the object-side surface of the third lens L3 is defined as R5, a curvature radius of the image-side surface of the third lens L3 is defined as R6, a focal length of the third lens L3 is defined as f3, an on-axis thickness of the third lens L3 is defined as d5, and the following conditions are satisfied:

$$0.40 \le (R5+R6)/(R5-R6) \le 1.50 \quad (13)$$

$$0.75 \le f3/f \le 2.70 \quad (14)$$

$$0.05 \le d5/TTL \le 0.22 \quad (15)$$

The condition (13) specifies the shape of the third lens L3. Reasonable control of the shape of the third lens L3 can moderate the degree of deflection of light after passing through the third lens L3, effectively reducing aberration. More preferably, 0.67≤(R5+R6)/(R5−R6)≤1.17. The condition (14) specifies the ratio of the focal length f3 of the third lens L3 to the focal length of the camera optical lens 10. Within this range, it is conductive to reducing the aberration and improving the imaging quality. More preferably, 1.19≤f3/f≤2.13. The condition (15) specifies the on-axis thickness d5 of the third lens L3. Within the range limited by the condition (15), it is conductive to the ultra-thin design of the camera optical lens 10. More preferably, 0.10≤d5/TTL≤0.17.

In this embodiment, an object-side surface of the fourth lens L4 is convex in a paraxial region, an image-side surface of the fourth lens L4 is convex in the paraxial region, and the fourth lens L4 has a positive refractive power. In other optional embodiments, the object-side surface and image-side surface of the fourth lens L4 may be arranged in other concave and convex arrangements, and the fourth lens L4 may have a negative refractive power.

Preferably, a curvature radius of the object-side surface of the fourth lens L4 is defined as R7, a curvature radius of the image-side surface of the fourth lens L4 is defined as R8, a focal length of the fourth lens L4 is defined as f4, an on-axis thickness of the fourth lens L4 is defined as d7, and the following conditions are satisfied:

$$0.07 \le (R7+R8)/(R7-R8) \le 0.70 \quad (16)$$

$$0.70 \le f4/f \le 3.00 \quad (17)$$

$$0.05 \le d7/TTL \le 0.30 \quad (18)$$

The condition (16) specifies the shape of the fourth lens L4, which facilitates improving the imaging quality within the condition range. More preferably, 0.15≤(R7+R8)/(R7−R8)≤0.52. The condition (17) specifies the ratio of the focal length f4 of the fourth lens L4 to the focal length f of the camera optical lens 10, which facilitates reducing aberration and improving imaging quality within the condition range. More preferably, 1.18≤f4/f≤2.31. The condition (18) specifies the on-axis thickness d7 of the fourth lens L4, which facilitates compressing the total track length TTL of the camera optical lens 10. More preferably, 0.11≤d7/TTL≤0.22.

In this embodiment, an object-side surface of the fifth lens L5 is concave in a paraxial region, an image-side surface of the fifth lens L5 is concave in the paraxial region, and the fifth lens L5 has a negative refractive power. In other optional embodiments, the object-side surface and the image-side surface of the fifth lens L5 may be arranged in other concave and convex arrangements, and the fifth lens L5 may have a positive refractive power.

Preferably, a curvature radius of the object-side surface of the fifth lens L5 is defined as R9, a curvature radius of the image-side surface of the fifth lens L5 is defined as R10, a focal length of the fifth lens L5 is defined as f5, an on-axis thickness of the fifth lens L5 is defined as d9, and the following conditions are satisfied:

$$-2.00 \le (R9+R10)/(R9-R10) \le -0.20 \quad (19)$$

$$-5.00 \le f5/f \le -0.50 \quad (20)$$

$$0.01 \le d9/TTL \le 0.20 \quad (21)$$

The condition (19) specifies the shape of the fifth lens L5. Within the range specified by condition, the degree of deflection of light passing through the fifth lens L5 can be moderated, effectively reducing aberration. More preferably, −1.14≤(R9+R10)/(R9−R10)≤−0.26. The condition (20) specifies the ratio of the focal length f5 of the fifth lens L5 to the focal length f of the camera optical lens 10, which facilitates improving the performance of the optical system within the range specified by condition. More preferably, −2.95≤f5/f≤−0.88. The condition (21) specifies the on-axis thickness d9 of the fifth lens L5, which, within the range specified by condition, facilitates achieving the ultra-thin design of the camera optical lens 10. More preferably, 0.04≤d9/TTL≤0.14.

In this embodiment, an object-side surface of the sixth lens L6 is convex in a paraxial region, an image-side surface of the sixth lens L6 is concave in the paraxial region, and the sixth lens L6 has a positive refractive power. In other optional embodiments, the object-side surface and the image-side surface of the sixth lens L6 may be arranged in other concave and convex arrangements, and the sixth lens L6 may have a negative refractive power.

Preferably, a curvature radius of the object-side surface of the sixth lens L6 is defined as R11, a curvature radius of the image-side surface of the sixth lens L6 is defined as R12, a focal length of the sixth lens L6 is defined as f6, an on-axis thickness of the sixth lens L6 is defined as d11, and the following conditions are satisfied:

$$-7.50 \le (R11+R12)/(R11-R12) \le -1.00 \quad (22)$$

$$0.60 \le f6/f \le 5.00 \quad (23)$$

$$0.01 \le d11/TTL \le 0.15 \quad (24)$$

The condition (22) specifies the shape of the sixth lens L6. Within the range specified by the condition, it is conducive to correcting problems such as the off-axis aberration. More preferably, −4.52≤(R11+R12)/(R11−R12)≤−1.33. The condition (23) specifies the ratio of the focal length f6 of the sixth lens L6 to the focal length f of the camera optical lens 10, which, within the range specified by condition, facilitates reducing the aberration and improving the imaging quality. More preferably, 1.22≤f6/f<3.89. The condition (24) specifies the ratio of the thickness d11 of the sixth lens L6 to the total track length f of the camera optical lens 10, which, within the range specified by condition, facilitates the ultra-thin design of the camera optical lens 10. More preferably, 0.06≤d11/TTL≤0.09.

Preferably, FNO refers to F number of the camera optical lens 10, which further satisfies the following condition:

$$FNO \le 2.28 \quad (25)$$

The condition (25) specifies the F number of the aperture of the camera optical lens 10, which, within the range limited by the condition (25), enables the camera optical lens 10 to have the characteristic of large aperture.

Preferably, a field of view of the camera optical lens is defined as FOV, and the following conditions are satisfied:

$$FOV \ge 133° \quad (26)$$

The condition (26) specifies the field of view of the camera optical lens 10, which, within the range limited by the condition (26), enables the camera optical lens 10 to have the characteristic of ultra-wide angle.

Preferably, the first lens L1 is an optical plastic lens, the second lens L2 is an optical plastic lens, the third lens L3 is an optical glass lens, the fourth lens L4 is an optical plastic lens, the fifth lens L5 is an optical plastic lens, and the sixth lens L6 is an optical plastic lens.

In this embodiment, an optical element such as an optical filter GF is provided between the sixth lens L6 and an image surface Si. The optical filter GF may be a glass cover plate or an optical filter (filter). As shown in FIG. 1, a first optical filter GF1 and a second optical filter GF2 are provided between the sixth lens L6 and the image surface Si. In other embodiments, the optical filter GF is made of glass. In other embodiments, the optical filter GF may be provided at other positions.

The camera optical lens 10 according to the present disclosure has have good optical performance and has the characteristics of large aperture and ultra-wide angle. In addition, the working waveband of the camera optical lens 10 of the present disclosure can cover both visible and infrared light, and can achieve day and night confocality of the camera optical lens of the in-vehicle laser radar.

In the following, the camera optical lens 10 according to the present disclosure will be described with examples. The symbols recorded in each example are shown in table 1, and the units of the focal length, the on-axis distance, the curvature radius, the on-axis thickness, the inflexion points, and the arrest points are millimeters.

TTL refers to a total track length (an on-axis distance from the object-side surface of the first lens L1 to the image surface) in units of millimeters.

Preferably, an inflexion point and/or an arrest point may be provided on the object-side surface and/or the image-side surface of the lens, so as to meet high quality imaging requirements. The specific implementations can make reference to the following description.

FIG. 1 is a schematic structural diagram of the camera optical lens 10 according to a first embodiment. The following shows design data of the camera optical lens 10 according to a first embodiment of the present disclosure.

Table 1 lists the curvature radius R of the object-side surface or the image-side surface, the on-axis thickness of the lens, the on-axis distance d between the lenses, the refractive index nd and the Abbe number νd in the first lens L1 to the sixth lens L6 constituting the camera optical lens 10 according to the first embodiment of the present disclosure. Table 2 illustrates a conic coefficient k and aspheric surface coefficients of the camera optical lens 10.

It is noted that in this embodiment, the units of the distance, the radius and the thickness are millimeters (mm).

TABLE 1

| | R | D | | nd | | vd | |
|---|---|---|---|---|---|---|---|
| S1 | ∞ | d0= | −3.196 | | | | |
| R1 | 14.829 | d1= | 0.642 | nd1 | 1.5362 | vd1 | 55.62 |
| R2 | 1.783 | d2= | 0.820 | | | | |
| R3 | 14.415 | d3= | 0.395 | nd2 | 1.6613 | vd2 | 20.37 |
| R4 | 8.903 | d4= | 1.441 | | | | |
| R5 | 194.524 | d5= | 1.662 | nd3 | 1.7292 | vd3 | 54.67 |
| R6 | −2.889 | d6= | 0.933 | | | | |
| R7 | 6.527 | d7= | 2.200 | nd4 | 1.5362 | vd4 | 55.62 |
| R8 | −2.653 | d8= | 0.005 | | | | |
| R9 | −2.653 | d9= | 1.002 | nd5 | 1.6613 | vd5 | 20.37 |
| R10 | 10.535 | d10= | 0.778 | | | | |
| R11 | 1.959 | d11= | 0.926 | nd6 | 1.5362 | vd6 | 55.62 |
| R12 | 5.123 | d12= | 0.486 | | | | |
| R13 | ∞ | d13= | 0.300 | ndg1 | 1.5168 | vg1 | 64.17 |
| R14 | ∞ | d14= | 0.050 | | | | |
| R15 | ∞ | d15= | 0.400 | ndg2 | 1.5168 | vg2 | 64.17 |
| R16 | ∞ | d16= | 0.585 | | | | |

The meanings of the symbols in the above table are listed as follows.

R: curvature radius of the optical surface, and central curvature radius in the case of a lens;

S1: aperture;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the sixth lens L6;

R12: curvature radius of the image-side surface of the sixth lens L6;

R13: curvature radius of the object-side surface of the first optical filter GF1;

R14: curvature radius of the image-side surface of the first optical filter GF1;

R15: curvature radius of the object-side surface of the second optical filter GF2;

R16: curvature radius of the image-side surface of the second optical filter GF2;

d: on-axis thickness of the lens or on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the first optical filter GF1;

d13: on-axis thickness of the first optical filter GF1;

d14: on-axis distance from the image-side surface of the first optical filter GF1 to the object-side surface of the second optical filter GF2;

d15: on-axis thickness of the second optical filter GF2;

d16: on-axis distance from the image-side surface of the second optical filter GF2 to the image surface Si;

nd: refractive index of d-line;

nd1: refractive index of the first lens L1;

nd2: refractive index of the second lens L2;

nd3: refractive index of the third lens L3;

nd4: refractive index of the fourth lens L4;

nd5: refractive index of the fifth lens L5;

nd6: refractive index of the sixth lens L6;

ndg1: refractive index of the first optical filter GF1;

ndg2: refractive index of the second optical filter GF2;

vd: Abbe number;

vd1: Abbe number of the first lens L1;

vd2: Abbe number of the second lens L2;

vd3: Abbe number of the third lens L3;

vd4: Abbe number of the fourth lens L4;

vd5: Abbe number of the fifth lens L5;

vd6: Abbe number of the sixth lens L6;

vg1: Abbe number of the first optical filter GF1;

vg2: Abbe number of the second optical filter GF2.

TABLE 2

| | Conic coefficient | Aspheric surface coefficients | | | | | | |
|---|---|---|---|---|---|---|---|---|
| | K | A4 | A6 | A8 | A10 | A12 | A14 | A16 |
| R1 | 1.24203E+01 | 4.98530E−02 | −3.18390E−02 | 9.95440E−03 | −1.89990E−03 | 2.35370E−04 | −1.90530E−05 | 9.73730E−07 |
| R2 | −3.77251E−01 | 8.43800E−02 | −1.54250E−02 | −8.69520E−02 | 1.04990E−01 | −7.13570E−02 | 3.22770E−02 | −9.16740E−03 |
| R3 | −2.97229E+01 | 6.62200E−02 | −1.07940E−02 | −4.78060E−02 | 8.90740E−02 | −8.83250E−02 | 5.82480E−02 | −2.56460E−02 |
| R4 | 7.66465E+00 | 6.62180E−02 | 1.17970E−02 | −7.41140E−02 | 1.43390E−01 | −1.48990E−01 | 1.01770E−01 | −4.67410E−02 |
| R5 | / | / | / | / | / | / | / | / |

TABLE 2-continued

| | | | | | | | | |
|---|---|---|---|---|---|---|---|---|
| R6 | / | / | / | / | / | / | / | / |
| R7 | −3.13810E+01 | 1.42690E−02 | −3.47070E−03 | 1.19690E−04 | 1.03160E−03 | −8.47510E−04 | 3.45730E−04 | −7.94610E−05 |
| R8 | −3.25037E+00 | −1.01040E−01 | 4.82610E−02 | 4.48160E−03 | −2.06850E−02 | 1.21460E−02 | −3.59020E−03 | 5.99620E−04 |
| R9 | −3.25037E+00 | −1.01040E−01 | 4.82610E−02 | 4.48160E−03 | −2.06850E−02 | 1.21460E−02 | −3.59020E−03 | 5.99620E−04 |
| R10 | −8.09912E+01 | −5.76870E−02 | 3.41630E−02 | −1.34550E−02 | 3.88630E−03 | −8.61150E−04 | 1.45940E−04 | −1.72260E−05 |
| R11 | −8.23885E+00 | 4.95080E−02 | −6.65360E−02 | 4.21620E−02 | −1.75540E−02 | 4.71790E−03 | −7.23170E−04 | 2.34120E−05 |
| R12 | −5.13229E+00 | 1.49330E−03 | −4.77900E−03 | −4.92860E−03 | 8.34620E−03 | −5.62410E−03 | 2.30820E−03 | −6.41720E−04 |

| | Conic coefficient | Aspheric surface coefficients | | | | | | |
|---|---|---|---|---|---|---|---|---|
| | K | A18 | A20 | A22 | A24 | A26 | A28 | A30 |
| R1 | 1.24203E+01 | −2.85230E−08 | 3.64900E−10 | / | / | / | / | / |
| R2 | −3.77251E−01 | 1.43060E−03 | −9.23690E−05 | / | / | / | / | / |
| R3 | −2.97229E+01 | 7.00990E−03 | −1.05770E−03 | / | / | / | / | / |
| R4 | 7.66465E+00 | 1.26490E−02 | −1.46100E−03 | / | / | / | / | / |
| R5 | / | / | / | / | / | / | / | / |
| R6 | / | / | / | / | / | / | / | / |
| R7 | −3.13810E+01 | 9.82330E−06 | −5.11260E−07 | / | / | / | / | / |
| R8 | −3.25037E+00 | −5.45090E−05 | 2.13240E−06 | / | / | / | / | / |
| R9 | −3.25037E+00 | −5.45090E−05 | 2.13240E−06 | / | / | / | / | / |
| R10 | −8.09912E+01 | 1.21350E−06 | −3.76590E−08 | / | / | / | / | / |
| R11 | −8.23885E+00 | 1.35120E−05 | −2.68610E−06 | 1.93330E−07 | 1.78770E−09 | −1.22260E−09 | 7.63170E−11 | −1.61040E−12 |
| R12 | −5.13229E+00 | 1.25790E−04 | −1.76140E−05 | 1.75370E−06 | −1.21350E−07 | 5.54780E−09 | −1.50680E−10 | 1.84040E−12 |

It should be noted that an aspheric surface of each lens surface in this embodiment uses the aspheric surfaces shown in the above condition (27). However, the specific form of the condition (27) below is only an example, and the present disclosure is not limited to the aspherical polynomials form shown in the condition (27).

$$z=(c^2/r)/\{1+[1(k+1)(c^2/r^2)]^{1/2}\}+A4r^4+A6r^6+A8r^8+A10r^{10}+A12r^{12}+A14r^{14}+A16r^{16}+A18r^{18}+A20r^{20}+A22r^{22}+A24r^{24}+A26r^{26}+A28r^{28}+A30r^{30} \quad (27)$$

K is a conic coefficient, and A4, A6, A8, A10, A12, A14, A16, A18, A20, A22, A24, A26, A28 and A30 are aspheric surface coefficients. c is a curvature at the center of the optical surface, r is a vertical distance between the point on an aspheric curve and the optical axis, and z is an aspheric depth (a vertical distance between the point on the aspheric surface having a distance of r from the optical axis, and a tangent plane tangent to a vertex on the optical axis of an aspheric surface).

Table 3 and Table 4 show design data of inflexion points and arrest points of each lens of the camera optical lens 10 according to the first embodiment of the present disclosure. Herein, P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens L4, P5R1 and P5R2 respectively represent the object-side surface and the image-side surface of the fifth lens L5, and P6R1 and P6R2 respectively represent the object-side surface and the image-side surface of the sixth lens L6. The data in the column named "inflexion point position" refers to vertical distances from inflexion points arranged on each lens surface to the optical axis of the camera optical lens 10. The data in the column named "arrest point position" refers to vertical distances from arrest points arranged on each lens surface to the optical axis of the camera optical lens 10.

TABLE 3

| | Number of inflexion points | Inflexion point position 1 | Inflexion point position 2 | Inflexion point position 3 |
|---|---|---|---|---|
| P1R1 | 2 | 1.345 | 1.915 | / |
| P1R2 | 1 | 1.555 | / | / |
| P2R1 | 1 | 1.365 | / | / |
| P2R2 | 0 | / | / | / |
| P3R1 | 0 | / | / | / |
| P3R2 | 0 | / | / | / |
| P4R1 | 1 | 2.015 | / | / |
| P4R2 | 1 | 1.985 | / | / |
| P5R1 | 1 | 1.985 | / | / |
| P5R2 | 2 | 0.385 | 1.725 | / |
| P6R1 | 3 | 0.985 | 2.465 | 3.095 |
| P6R2 | 3 | 1.245 | 2.885 | 3.265 |

TABLE 4

| | Number of arrest points | Arrest point position 1 | Arrest point position 2 | Arrest point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 0 | / | / | / |
| P3R2 | 0 | / | / | / |
| P4R1 | 0 | / | / | / |
| P4R2 | 0 | / | / | / |
| P5R1 | 0 | / | / | / |
| P5R2 | 2 | 0.745 | 2.195 | / |
| P6R1 | 3 | 1.905 | 2.955 | 3.155 |
| P6R2 | 1 | 2.105 | / | / |

In addition, in the following table 25, values corresponding to parameters specified in the conditions and various parameters in the first embodiment are listed.

Figure 2:
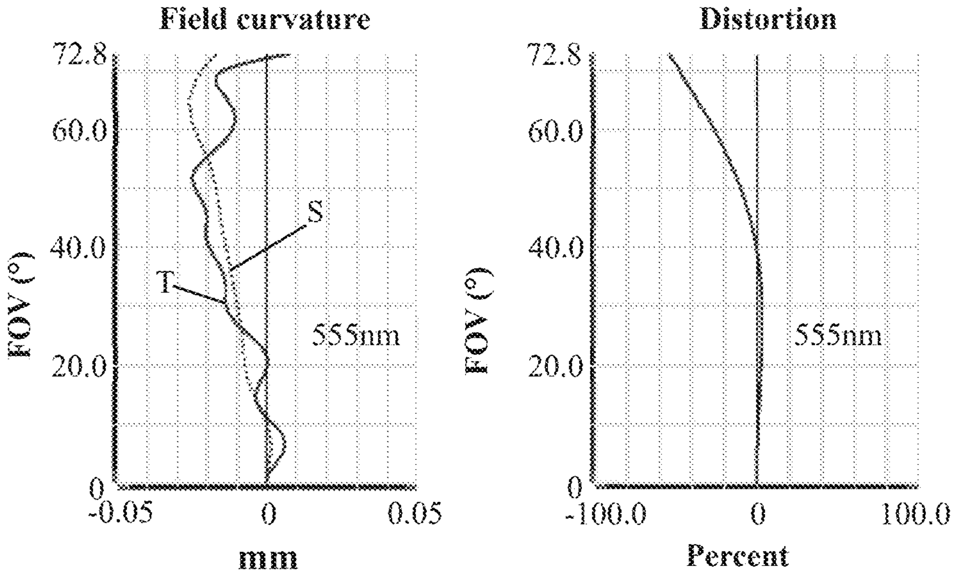
FIG. 2 is a schematic diagram of a field curvature and a distortion of the camera optical lens shown in FIG. 1.
Figure 3:
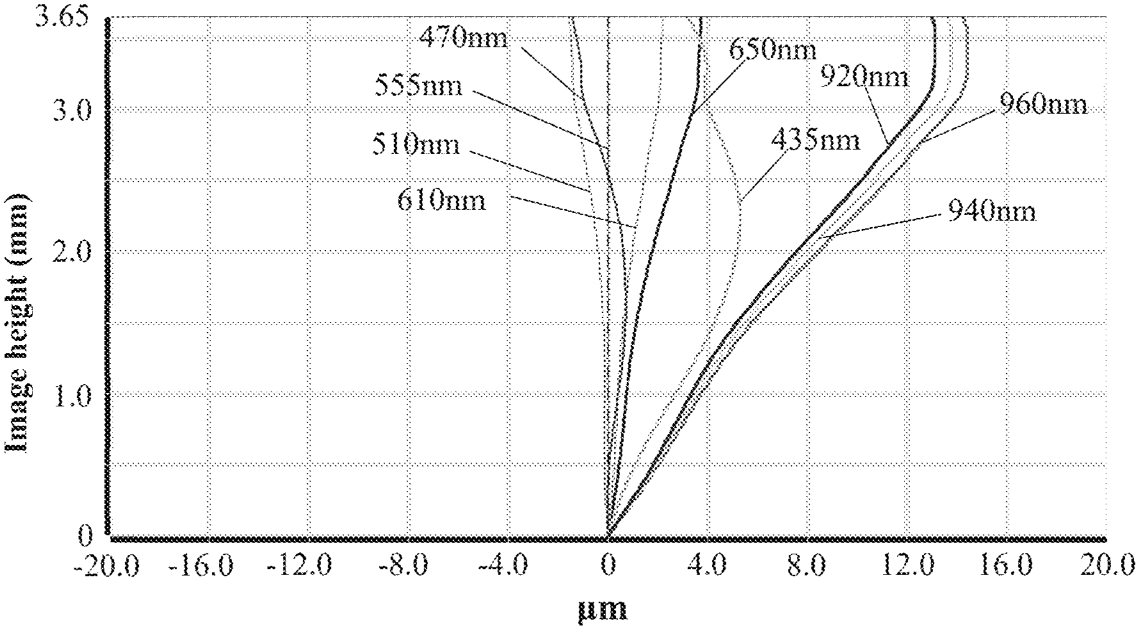
FIG. 3 is a schematic diagram of a lateral color of the camera optical lens shown in FIG. 1.
Figure 4:
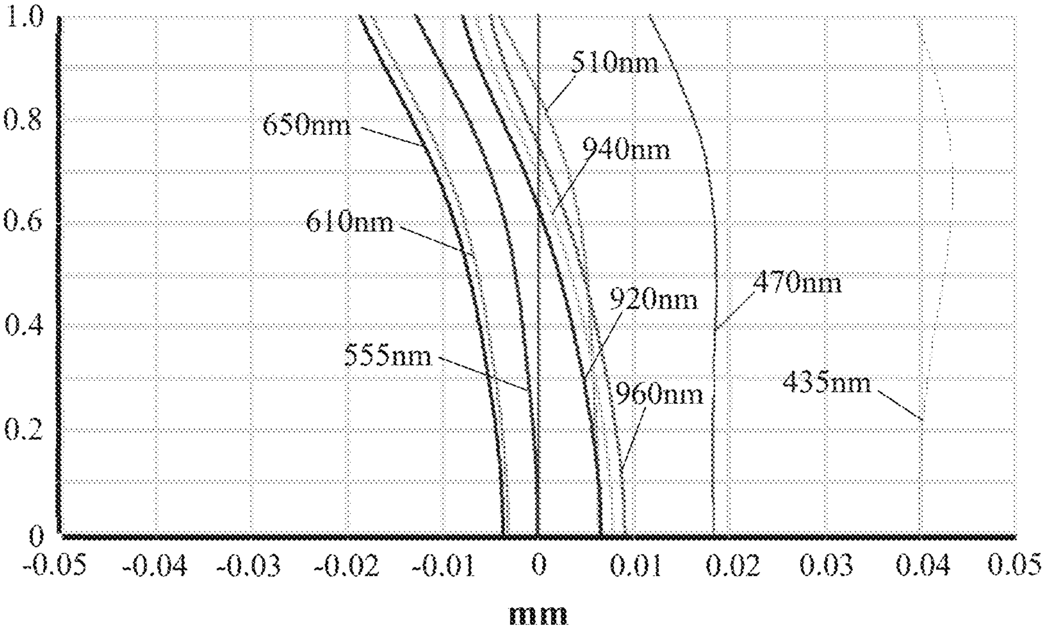
FIG. 4 is a schematic diagram of a longitudinal aberration of the camera optical lens shown in FIG. 1.

FIG. 2 shows a field curvature and a distortion after light with a wavelength of 555 nm passes through the camera optical lens 10 in the first embodiment. In FIG. 2, the field curvature S is a field curvature in the sagittal direction, and the field curvature T is a field curvature in the meridian direction. FIG. 3 is a schematic diagram illustrating lateral colors after light with wavelengths of 435 nm, 470 nm, 510 nm, 555 nm, 610 nm, 650 nm, 920 nm, 940 nm and 960 nm passes through the camera optical lens 10 in the first embodiment. FIG. 4 is a schematic diagram illustrating longitudinal aberrations after light with wavelengths of 435 nm, 470 nm, 510 nm, 555 nm, 610 nm, 650 nm, 920 nm, 940 nm and 960 nm passes through the camera optical lens 10 in the first embodiment.

As shown in Table 25, the first embodiment satisfies the various conditions.

In this embodiment, the entrance pupil diameter of the camera optical lens 10 is 1.092 mm, the full vision field image height is 3.648 mm, and the field of view (FOV) in a diagonal direction is 145.60°. Thus, the camera optical lens 10 meets the design requirements for large aperture, ultra-wide angle and ultra-thinness, and the on-axis and off-axis aberrations are sufficiently corrected, thereby achieving excellent optical performance.

Second Embodiment

Figure 5:
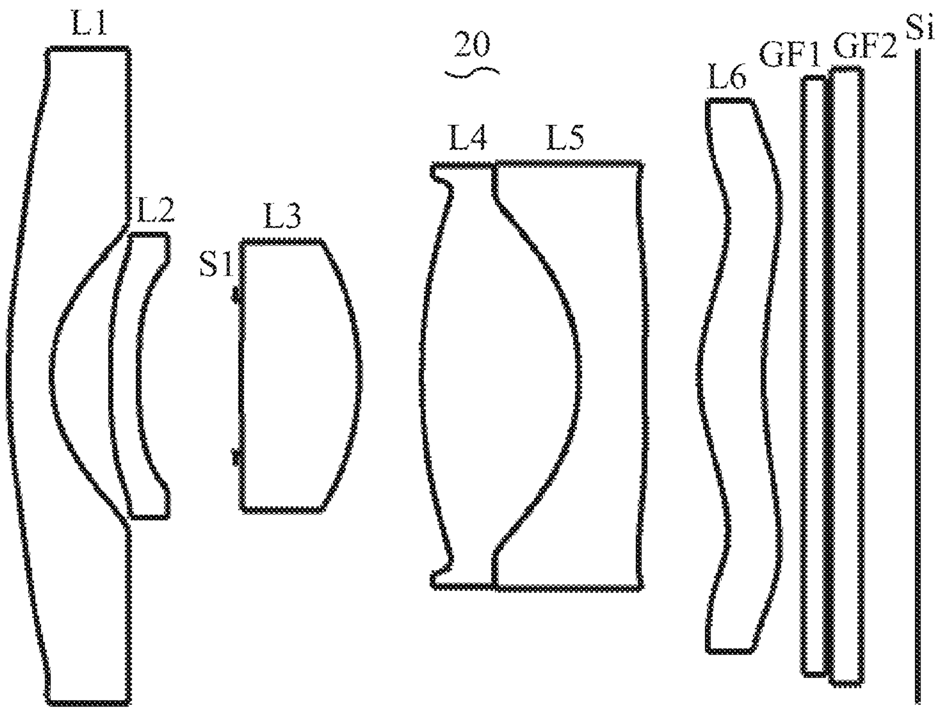
FIG. 5 is a schematic structural diagram of a camera optical lens according to a second embodiment of the present disclosure.

FIG. 5 is a schematic structural diagram of the camera optical lens 20 according to the second embodiment. The second embodiment is substantially the same as the first embodiment, and the meanings of the symbols in the second embodiment are the same as the meanings of the symbols in the first embodiment. In the following, only differences are described.

Table 5 and Table 6 show design data of the camera optical lens 20 in the second embodiment of the present disclosure.

TABLE 5

| | R | | d | | nd | | vd |
|---|---|---|---|---|---|---|---|
| S1 | ∞ | d0= | −3.099 | | | | |
| R1 | 15.158 | d1= | 0.584 | nd1 | 1.5362 | vd1 | 55.62 |
| R2 | 1.785 | d2= | 0.807 | | | | |
| R3 | 15.943 | d3= | 0.383 | nd2 | 1.6613 | vd2 | 20.37 |
| R4 | 8.357 | d4= | 1.406 | | | | |
| R5 | 200.473 | d5= | 1.609 | nd3 | 1.7292 | vd3 | 54.67 |
| R6 | −2.898 | d6= | 0.857 | | | | |
| R7 | 6.620 | d7= | 2.145 | nd4 | 1.5362 | vd4 | 55.62 |
| R8 | −2.700 | d8= | 0.005 | | | | |
| R9 | −2.700 | d9= | 0.895 | nd5 | 1.6613 | vd5 | 20.37 |
| R10 | 10.731 | d10= | 0.753 | | | | |
| R11 | 1.971 | d11= | 0.876 | nd6 | 1.5362 | vd6 | 55.62 |
| R12 | 5.271 | d12= | 0.546 | | | | |
| R13 | ∞ | d13= | 0.300 | ndg1 | 1.5168 | vg1 | 64.17 |
| R14 | ∞ | d14= | 0.088 | | | | |
| R15 | ∞ | d15= | 0.400 | ndg2 | 1.5168 | vg2 | 64.17 |
| R16 | ∞ | d16= | 0.773 | | | | |

TABLE 6

| | Conic coefficient | Aspheric surface coefficients | | | | | | |
|---|---|---|---|---|---|---|---|---|
| | k | A4 | A6 | A8 | A10 | A12 | A14 | A16 |
| R1 | 1.21333E+01 | 4.97590E−02 | −3.18450E−02 | 9.95410E−03 | −1.89990E−03 | 2.35370E−04 | −1.90530E−05 | 9.73750E−07 |
| R2 | −3.76593E−01 | 8.13570E−02 | −1.54590E−02 | −8.69650E−02 | 1.04990E−01 | −7.13550E−02 | 3.22780E−02 | −9.16720E−03 |
| R3 | −2.81947E+01 | 6.62240E−02 | −1.07990E−02 | −4.78100E−02 | 8.90730E−02 | −8.83260E−02 | 5.82480E−02 | −2.56470E−02 |
| R4 | 9.34010E+00 | 6.89770E−02 | 1.16600E−02 | −7.38190E−02 | 1.43380E−01 | −1.49000E−01 | 1.01770E−01 | −4.67460E−02 |
| R5 | / | / | / | / | / | / | / | / |
| R6 | / | / | / | / | / | / | / | / |
| R7 | −3.01905E+01 | 1.43280E−02 | −3.46900E−03 | 1.19290E−04 | 1.03140E−03 | −8.47520E−04 | 3.45750E−04 | −7.94560E−05 |
| R8 | −3.21246E+00 | −1.00150E−01 | 4.80830E−02 | 4.44600E−03 | −2.06870E−02 | 1.21450E−02 | −3.59000E−03 | 5.99620E−04 |
| R9 | −3.21246E+00 | −1.00150E−01 | 4.80830E−02 | 4.44600E−03 | −2.06870E−02 | 1.21450E−02 | −3.59000E−03 | 5.99620E−04 |
| R10 | −1.04341E+02 | −5.78650E−02 | 3.41660E−02 | −1.34550E−02 | 3.88650E−03 | −8.61130E−04 | 1.45940E−04 | −1.72260E−05 |
| R11 | −8.29736E+00 | 4.93860E−02 | −6.65000E−02 | 4.21610E−02 | −1.75540E−02 | 4.71790E−03 | −7.23170E−04 | 2.34120E−05 |
| R12 | −5.70970E+00 | 1.45740E−03 | −4.76840E−03 | −4.92880E−03 | 8.34610E−03 | −5.62410E−03 | 2.30820E−03 | −6.41720E−04 |

| | Conic coefficient | Aspheric surface coefficients | | | | | | |
|---|---|---|---|---|---|---|---|---|
| | k | A18 | A20 | A22 | A24 | A26 | A28 | A30 |
| R1 | 1.21333E+01 | −2.85220E−08 | 3.64530E−10 | / | / | / | / | / |
| R2 | −3.76593E−01 | 1.43070E−03 | −9.23480E−05 | / | / | / | / | / |
| R3 | −2.81947E+01 | 7.00990E−03 | −1.05770E−03 | / | / | / | / | / |
| R4 | 9.34010E+00 | 1.26450E−02 | −1.46350E−03 | / | / | / | / | / |
| R5 | / | / | / | / | / | | / | / |
| R6 | / | / | / | / | / | / | / | / |
| R7 | −3.01905E+01 | 9.82510E−06 | −5.10890E−07 | / | / | / | / | / |
| R8 | −3.21246E+00 | −5.45050E−05 | 2.13450E−06 | / | / | / | / | / |
| R9 | −3.21246E+00 | −5.45050E−05 | 2.13450E−06 | / | / | / | / | / |
| R10 | −1.04341E+02 | 1.21350E−06 | −3.76700E−08 | / | / | / | / | / |
| R11 | −8.29736E+00 | 1.35120E−05 | −2.68610E−06 | 1.93330E−07 | 1.78770E−09 | −1.22260E−09 | 7.63170E−11 | −1.61040E−12 |
| R12 | −5.70970E+00 | 1.25790E−04 | −1.76140E−05 | 1.75370E−06 | −1.21350E−07 | 5.54780E−09 | −1.50680E−10 | 1.84040E−12 |

Table 7 and table 8 show design data of inflexion points and arrest points of each lens of the camera optical lens 20 in the second embodiment of the present disclosure.

TABLE 7

| | Number of arrest points | Inflexion point position 1 | Inflexion point position 2 | Inflexion point position 3 | Inflexion point position |
|---|---|---|---|---|---|
| P1R1 | 4 | 1.335 | 1.975 | 3.345 | 3.865 |
| P1R2 | 1 | 1.565 | / | / | / |
| P2R1 | 2 | 1.365 | 1.805 | / | / |
| P2R2 | / | / | / | / | / |
| P3R1 | / | / | / | / | / |
| P3R2 | / | / | / | / | / |
| P4R1 | 1 | 2.055 | / | / | / |
| P4R2 | 1 | 1.955 | / | / | / |
| P5R1 | 1 | 1.955 | / | / | / |
| P5R2 | 3 | 0.375 | 1.745 | 2.615 | / |
| P6R1 | 3 | 0.985 | 2.465 | 2.985 | / |
| P6R2 | 3 | 1.215 | 2.885 | 3.225 | / |

TABLE 8

| | Number of arrest points | Arrest point position 1 | Arrest point position 2 |
|---|---|---|---|
| P1R1 | 2 | 3.755 | 3.935 |
| P1R2 | / | / | / |
| P2R1 | / | / | / |
| P2R2 | / | / | / |
| P3R1 | / | / | / |
| P3R2 | / | / | / |
| P4R1 | 1 | 2.265 | / |
| P4R2 | 1 | 2.245 | / |
| P5R1 | 1 | 2.245 | / |
| P5R2 | 2 | 0.715 | 2.225 |
| P6R1 | 1 | 1.905 | / |
| P6R2 | 1 | 2.085 | / |

In addition, in the following table 25, values corresponding to parameters specified in the conditions and various parameters in the second embodiment are listed.

Figure 6:
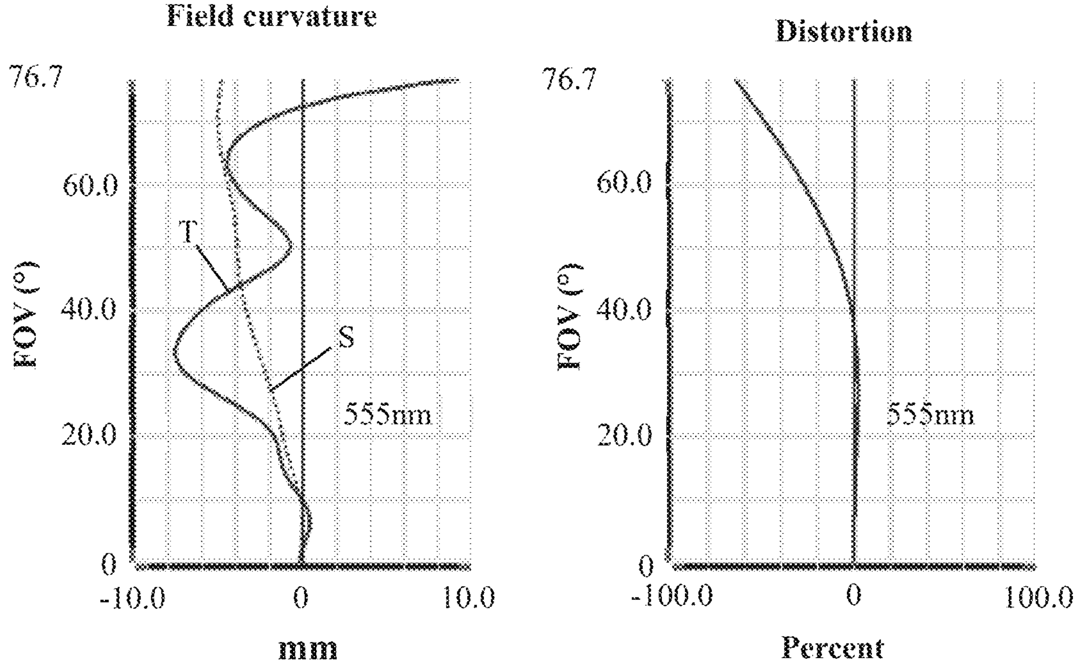
FIG. 6 is a schematic diagram of a field curvature and a distortion of the camera optical lens shown in FIG. 5.
Figure 7:
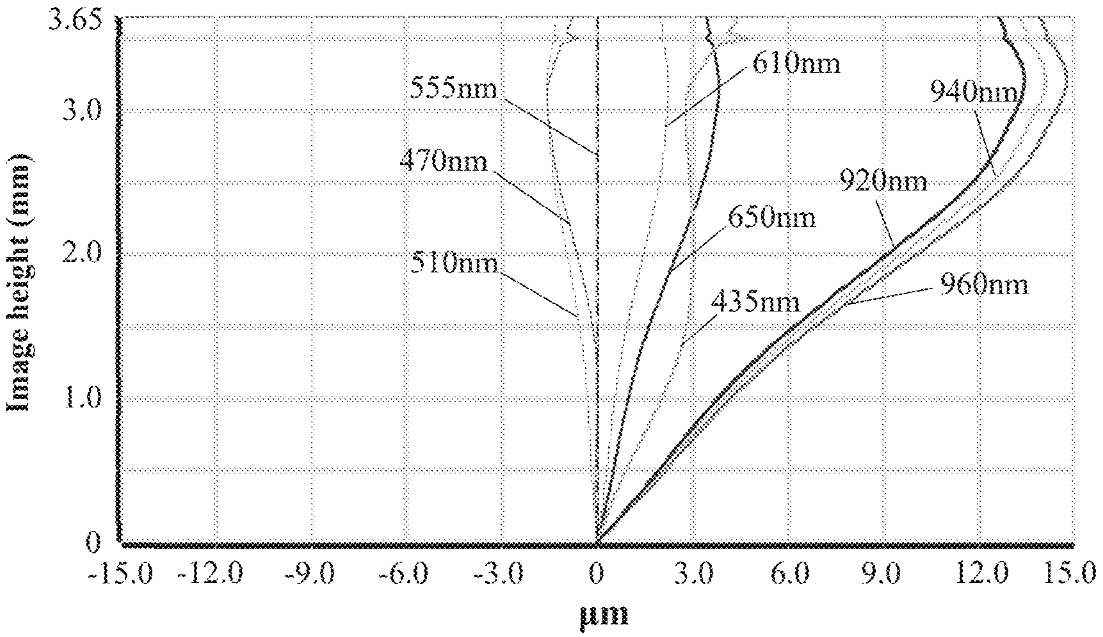
FIG. 7 is a schematic diagram of a lateral color of the camera optical lens shown in FIG. 5.
Figure 8:
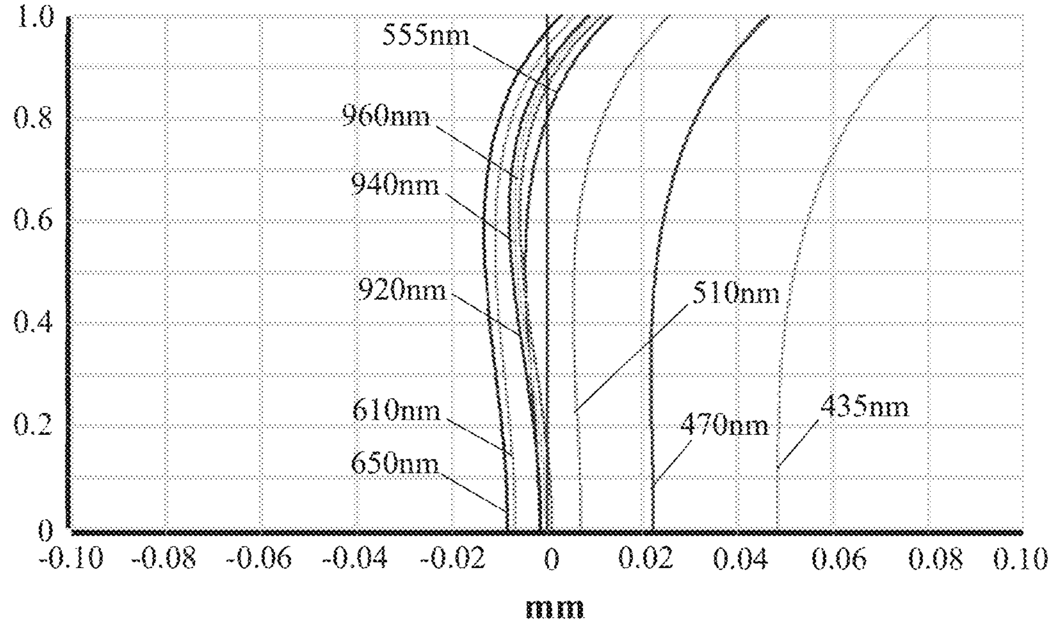
FIG. 8 is a schematic diagram of a longitudinal aberration of the camera optical lens shown in FIG. 5.

FIG. 6 shows a field curvature and a distortion after light with a wavelength of 555 nm passes through the camera optical lens 20 in the second embodiment. FIG. 7 is a schematic diagram illustrating lateral colors after light with wavelengths of 435 nm, 470 nm, 510 nm, 555 nm, 610 nm, 650 nm, 920 nm, 940 nm and 960 nm passes through the camera optical lens 20 in the second embodiment. FIG. 8 is a schematic diagram illustrating longitudinal aberrations after light with wavelengths of 435 nm, 470 nm, 510 nm, 555 nm, 610 nm, 650 nm, 920 nm, 940 nm and 960 nm passes through the camera optical lens 20 in the second embodiment.

As shown in Table 25, the second embodiment satisfies the various conditions.

In this embodiment, the entrance pupil diameter of the camera optical lens 20 is 1.090 mm, the full vision field image height is 3.648 mm, and the field of view (FOV) in a diagonal direction is 153.43°. Thus, the camera optical lens 20 meets the design requirements for large aperture, ultra-wide angle and ultra-thinness, and the on-axis and off-axis aberrations are sufficiently corrected, thereby achieving excellent optical performance.

Third Embodiment

Figure 9:
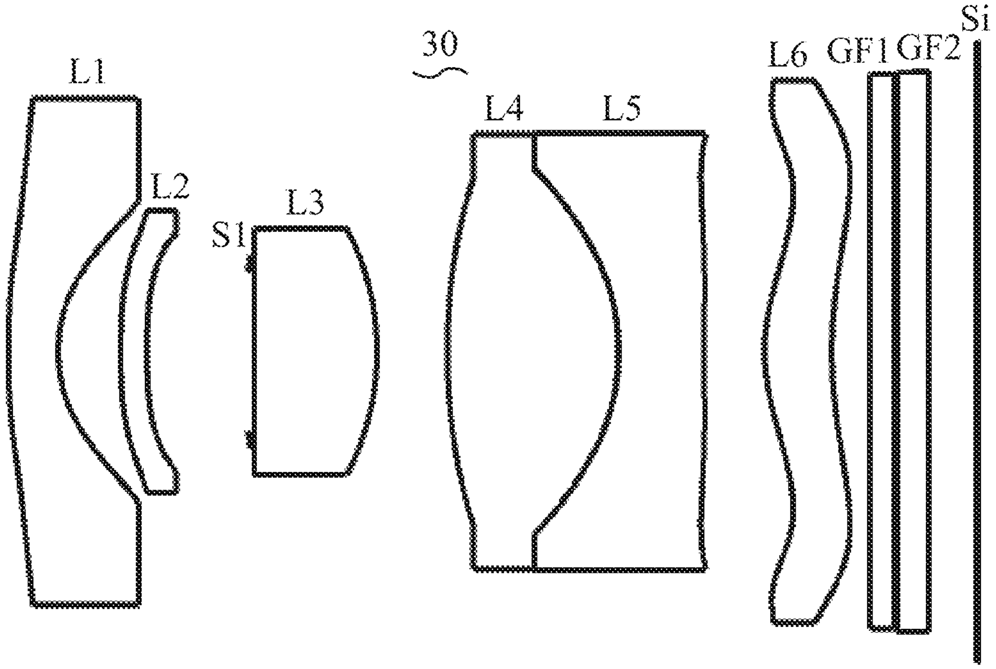
FIG. 9 is a schematic structural diagram of a camera optical lens according to a third embodiment of the present disclosure.

FIG. 9 is a schematic structural diagram of the camera optical lens 30 according to the third embodiment. The third embodiment is substantially the same as the first embodiment, and the meanings of the symbols in the third embodiment are the same as the meanings of the symbols in the first embodiment. In the following, only differences are described.

Table 9 and Table 10 show design data of the camera optical lens 30 in the third embodiment of the present disclosure.

TABLE 9

| | R | | d | | nd | | vd |
|---|---|---|---|---|---|---|---|
| S1 | ∞ | d0= | −3.116 | | | | |
| R1 | 15.320 | d1= | 0.645 | nd1 | 1.5362 | vd1 | 55.62 |
| R2 | 1.747 | d2= | 0.807 | | | | |
| R3 | 8.723 | d3= | 0.343 | nd2 | 1.6613 | vd2 | 20.37 |
| R4 | 8.352 | d4= | 1.383 | | | | |
| R5 | 160.603 | d5= | 1.593 | nd3 | 1.7241 | vd3 | 45.53 |
| R6 | −2.925 | d6= | 0.909 | | | | |
| R7 | 6.898 | d7= | 2.212 | nd4 | 1.5362 | vd4 | 55.62 |
| R8 | −2.717 | d8= | 0.005 | | | | |
| R9 | −2.717 | d9= | 1.103 | nd5 | 1.6613 | vd5 | 20.37 |
| R10 | 11.565 | d10= | 0.784 | | | | |
| R11 | 2.011 | d11= | 0.871 | nd6 | 1.5362 | vd6 | 55.62 |
| R12 | 4.934 | d12= | 0.498 | | | | |
| R13 | ∞ | d13= | 0.300 | ndg1 | 1.5168 | vg1 | 64.17 |
| R14 | ∞ | d14= | 0.054 | | | | |
| R15 | ∞ | d15= | 0.400 | ndg2 | 1.5168 | vg2 | 64.17 |
| R16 | ∞ | d16= | 0.644 | | | | |

TABLE 10

| | Conic coefficient | Aspheric surface coefficients | | | | | | |
|---|---|---|---|---|---|---|---|---|
| | k | A4 | A6 | A8 | A10 | A12 | A14 | A16 |
| R1 | 1.06617E+01 | 4.93040E−02 | −3.18540E−02 | 9.95370E−03 | −1.89990E−03 | 2.35370E−04 | −1.90530E−05 | 9.73730E−07 |
| R2 | −3.93023E−01 | 8.64300E−02 | −1.60310E−02 | −8.70610E−02 | 1.04970E−01 | −7.13570E−02 | 3.22780E−02 | −9.16710E−03 |
| R3 | −2.43138E+01 | 6.64360E−02 | −1.06300E−02 | −4.78170E−02 | 8.90660E−02 | −8.83240E−02 | 5.82490E−02 | −2.56470E−02 |
| R4 | −5.42111E+00 | 6.24500E−02 | 1.02010E−02 | −7.41640E−02 | 1.43480E−01 | −1.48910E−01 | 1.01840E−01 | −4.67380E−02 |
| R5 | / | / | / | / | / | / | / | / |
| R6 | / | / | / | / | / | / | / | / |
| R7 | −3.60384E+01 | 1.42050E−02 | −3.51110E−03 | 1.24840E−04 | 1.03250E−03 | −8.47260E−04 | 3.45780E−04 | −7.94540E−05 |
| R8 | −6.11917E+00 | −1.00070E−01 | 4.81690E−02 | 4.43870E−03 | −2.06880E−02 | 1.21450E−02 | −3.59050E−03 | 5.99570E−04 |
| R9 | −6.11917E+00 | −1.00070E−01 | 4.81690E−02 | 4.43870E−03 | −2.06880E−02 | 1.21450E−02 | −3.59050E−03 | 5.99570E−04 |
| R10 | −3.60522E+01 | −5.72420E−02 | 3.41680E−02 | −1.34550E−02 | 3.88630E−03 | −8.61150E−04 | 1.45940E−04 | −1.72270E−05 |
| R11 | −8.61973E+00 | 4.90340E−02 | −6.65230E−02 | 4.21630E−02 | −1.75540E−02 | 4.71780E−03 | −7.23170E−04 | 2.34110E−05 |
| R12 | −4.57527E+00 | 1.06250E−03 | −4.85940E−03 | −4.93100E−03 | 8.34610E−03 | −5.62410E−03 | 2.30820E−03 | −6.41720E−04 |

TABLE 10-continued

| | Conic coefficient | Aspheric surface coefficients | | | | | | |
|---|---|---|---|---|---|---|---|---|
| | k | A18 | A20 | A22 | A24 | A26 | A28 | A30 |
| R1 | 1.06617E+01 | −2.85470E−08 | 3.64760E−10 | / | / | / | / | / |
| R2 | −3.93023E−01 | 1.43060E−03 | −9.23590E−05 | / | / | / | / | / |
| R3 | 2.43138E+01 | 7.00990E−03 | −1.05760E−03 | / | / | / | / | / |
| R4 | −5.42111E+00 | 1.26500E−02 | −1.46510E−03 | / | / | / | / | / |
| R5 | / | / | / | / | / | | / | / |
| R6 | / | / | / | / | / | / | / | / |
| R7 | −3.60384E+01 | 9.82280E−06 | −5.11620E−07 | / | / | / | / | / |
| R8 | −6.11917E+00 | −5.45130E−05 | 2.13190E−06 | / | / | / | / | / |
| R9 | −6.11917E+00 | −5.45130E−05 | 2.13190E−06 | / | / | / | / | / |
| R10 | −3.60522E+01 | 1.21350E−06 | −3.76740E−08 | / | / | / | / | / |
| R11 | −8.61973E+00 | 1.35120E−05 | −2.68610E−06 | 1.93330E−07 | 1.78770E−09 | −1.22260E−09 | 7.63170E−11 | −1.61040E−12 |
| R12 | −4.57527E+00 | 1.25790E−04 | −1.76140E−05 | 1.75370E−06 | −1.21350E−07 | 5.54780E−09 | −1.50680E−10 | 1.84040E−12 |

Table 11 and Table 12 show design data of inflexion points and arrest points of each lens of the camera optical lens 30 in the third embodiment of the present disclosure.

TABLE 11

| | Number of inflexion points | Inflexion point position 1 | Inflexion point position 2 | Inflexion point position 3 |
|---|---|---|---|---|
| P1R1 | 3 | 1.295 | 2.255 | 2.535 |
| P1R2 | 1 | 1.555 | / | / |
| P2R1 | 2 | 1.375 | 1.655 | / |
| P2R2 | / | / | / | / |
| P3R1 | / | / | / | / |
| P3R2 | | / | / | / |
| P4R1 | 1 | 2.045 | / | / |
| P4R2 | 1 | 2.125 | / | / |
| P5R1 | 1 | 2.125 | / | / |
| P5R2 | 3 | 0.395 | 1.625 | 2.605 |
| P6R1 | 2 | 0.975 | 2.485 | / |
| P6R2 | 1 | 1.255 | / | / |

TABLE 12

| | Number of arrest points | Arrest point position 1 | Arrest point position 2 |
|---|---|---|---|
| P1R1 | / | / | / |
| P1R2 | / | / | / |
| P2R1 | / | / | / |
| P2R2 | / | / | / |
| P3R1 | / | / | / |
| P3R2 | / | / | / |
| P4R1 | / | / | / |
| P4R2 | 1 | 2.315 | / |
| P5R1 | 1 | 2.315 | / |
| P5R2 | 2 | 0.755 | 2.075 |
| P6R1 | 2 | 1.885 | 2.975 |
| P6R2 | 1 | 2.065 | / |

In addition, in the following table 25, values corresponding to parameters specified in the conditions and various parameters in the third embodiment are listed.

Figure 10:
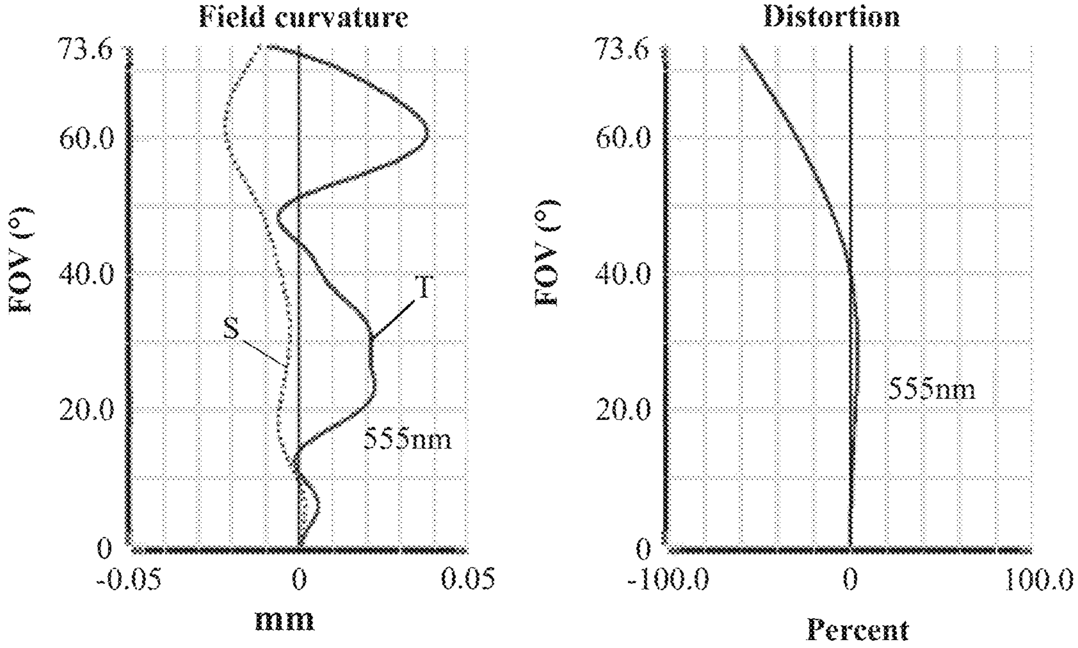
FIG. 10 is a schematic diagram of a field curvature and a distortion of the camera optical lens shown in FIG. 9.
Figure 11:
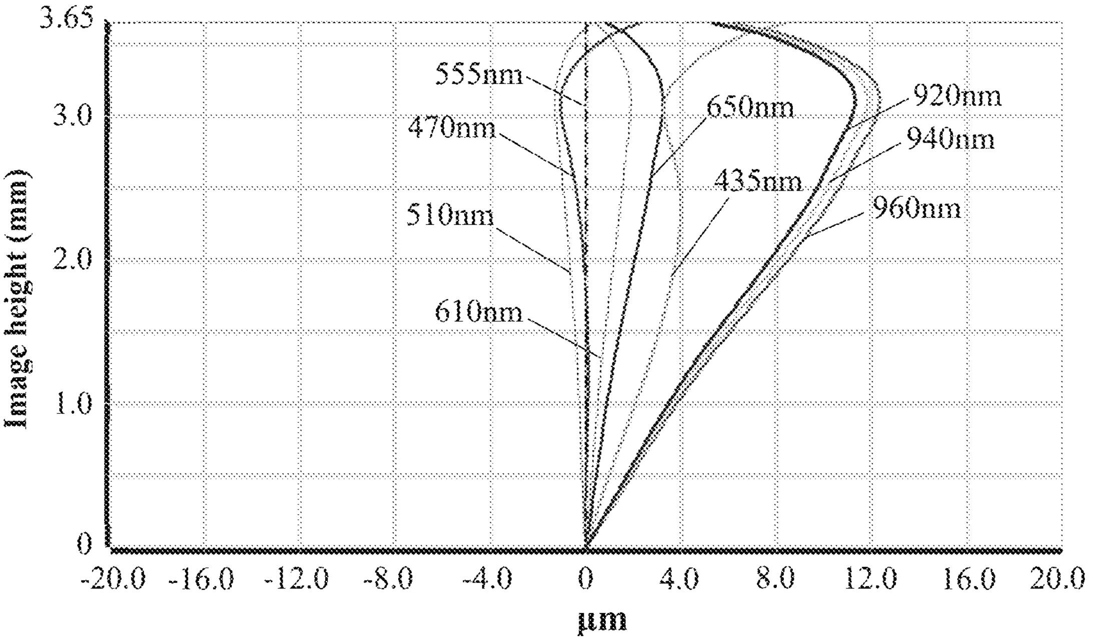
FIG. 11 is a schematic diagram of a lateral color of the camera optical lens shown in FIG. 9.
Figure 12:
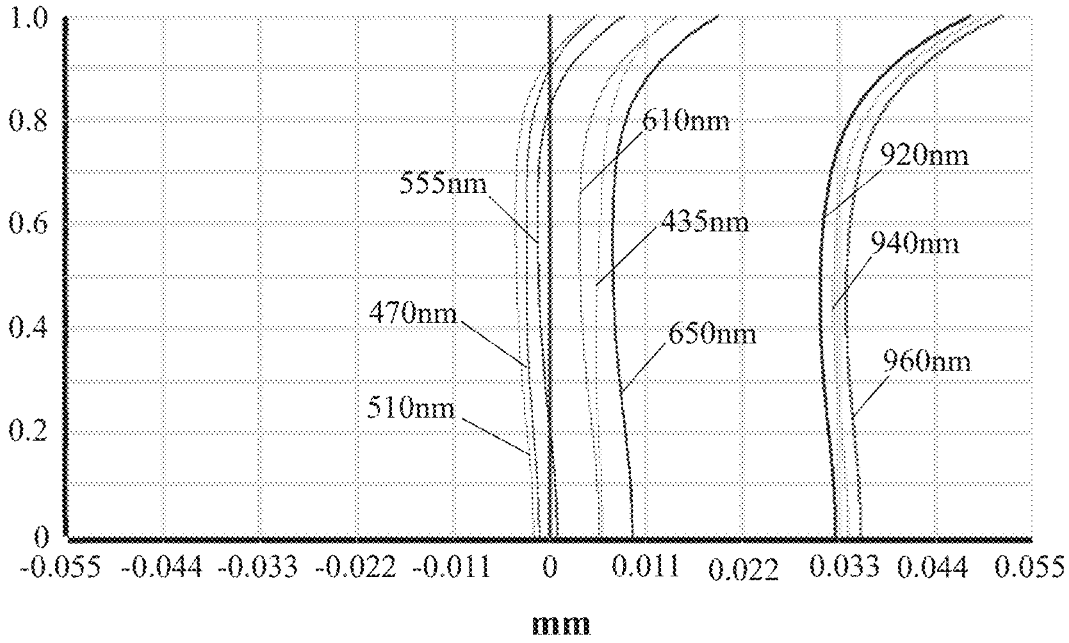
FIG. 12 is a schematic diagram of a longitudinal aberration of the camera optical lens shown in FIG. 9.

FIG. 10 shows a field curvature and a distortion after light with a wavelength of 555 nm passes through the camera optical lens 30 in the third embodiment. FIG. 11 is a schematic diagram illustrating lateral colors after light with wavelengths of 435 nm, 470 nm, 510 nm, 555 nm, 610 nm, 650 nm, 920 nm, 940 nm and 960 nm passes through the camera optical lens 30 in the third embodiment. FIG. 12 is a schematic diagram illustrating longitudinal aberrations after light with wavelengths of 435 nm, 470 nm, 510 nm, 555 nm, 610 nm, 650 nm, 920 nm, 940 nm and 960 nm passes through the camera optical lens 30 in the third embodiment.

As shown in Table 25, the third embodiment satisfies the various conditions.

In this embodiment, the entrance pupil diameter of the camera optical lens 30 is 1.177 mm, the full vision field image height is 3.648 mm, and the field of view (FOV) in a diagonal direction is 147.21°. Thus, the camera optical lens 30 meets the design requirements for large aperture, ultra-wide angle and ultra-thinness, and the on-axis and off-axis aberrations are sufficiently corrected, thereby achieving excellent optical performance.

Fourth Embodiment

Figure 13:
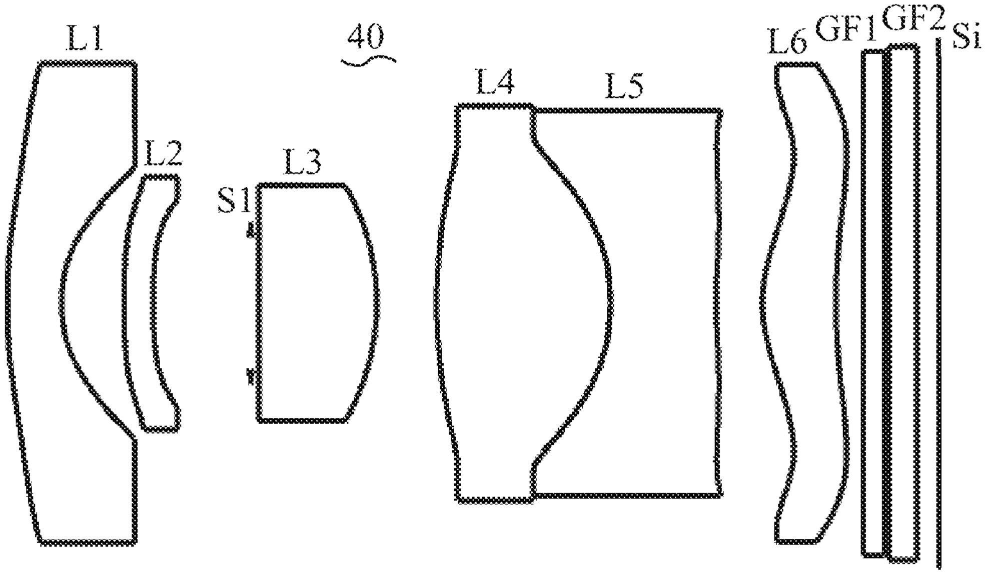
FIG. 13 is a schematic structural diagram of a camera optical lens according to a fourth embodiment of the present disclosure.

FIG. 13 is a schematic structural diagram of the camera optical lens 40 according to the fourth embodiment. The fourth embodiment is substantially the same as the first embodiment, and the meanings of the symbols in the fourth embodiment are the same as the meanings of the symbols in the first embodiment. In the following, only differences are described.

Table 13 and Table 14 show design data of the camera optical lens 40 in the fourth embodiment of the present disclosure.

TABLE 13

| | R | d | | nd | | vd | |
|---|---|---|---|---|---|---|---|
| S1 | ∞ | d0= | −3.470 | | | | |
| R1 | 13.047 | d1= | 0.766 | nd1 | 1.5362 | vd1 | 55.62 |
| R2 | 1.814 | d2= | 0.893 | | | | |
| R3 | 16.062 | d3= | 0.414 | nd2 | 1.6613 | vd2 | 20.37 |
| R4 | 7.939 | d4= | 1.508 | | | | |
| R5 | 141.852 | d5= | 1.692 | nd3 | 1.7292 | vd3 | 54.67 |
| R6 | −2.856 | d6= | 0.856 | | | | |
| R7 | 6.758 | d7= | 2.482 | nd4 | 1.5362 | vd4 | 55.62 |
| R8 | −2.730 | d8= | 0.005 | | | | |
| R9 | −2.730 | d9= | 1.506 | nd5 | 1.6613 | vd5 | 20.37 |
| R10 | 5.181 | d10= | 0.658 | | | | |
| R11 | 1.596 | d11= | 1.052 | nd6 | 1.5362 | vd6 | 55.62 |
| R12 | 6.905 | d12= | 0.393 | | | | |
| R13 | ∞ | d13= | 0.300 | ndg1 | 1.5168 | vg1 | 64.17 |
| R14 | ∞ | d14= | 0.070 | | | | |
| R15 | ∞ | d15= | 0.400 | ndg2 | 1.5168 | vg2 | 64.17 |
| R16 | ∞ | d16= | 0.314 | | | | |

TABLE 14

| | Conic coefficient | Aspheric surface coefficients | | | | | | |
|---|---|---|---|---|---|---|---|---|
| | k | A4 | A6 | A8 | A10 | A12 | A14 | A16 |
| R1 | 1.16674E+01 | 4.93740E−02 | −3.18560E−02 | 9.95390E−03 | −1.89990E−03 | 2.35370E−04 | −1.90540E−05 | 9.73720E−07 |
| R2 | −2.89216E−01 | 8.29960E−02 | −1.53280E−02 | −8.67790E−02 | 1.04990E−01 | −7.13470E−02 | 3.22780E−02 | −9.16720E−03 |
| R3 | −7.68950E+00 | 6.71790E−02 | −1.05860E−02 | −4.78120E−02 | 8.90680E−02 | −8.83230E−02 | 5.82480E−02 | −2.56460E−02 |
| R4 | 8.34496E+00 | 6.57510E−02 | 1.20340E−02 | −7.39730E−02 | 1.42610E−01 | −1.48720E−01 | 1.01810E−01 | −4.67460E−02 |
| R5 | / | / | / | / | / | / | / | / |
| R6 | / | / | / | / | / | / | / | / |
| R7 | −3.53181E+01 | 1.36000E−02 | −3.50850E−03 | 1.11770E−04 | 1.02890E−03 | −8.47820E−04 | 3.45710E−04 | −7.94570E−05 |
| R8 | −3.77715E+00 | −1.04580E−01 | 4.82790E−02 | 4.45950E−03 | −2.06700E−02 | 1.21450E−02 | −3.59010E−03 | 5.99650E−04 |
| R9 | −3.77715E+00 | −1.04580E−01 | 4.82790E−02 | 4.45950E−03 | −2.06700E−02 | 1.21450E−02 | −3.59010E−03 | 5.99650E−04 |
| R10 | −6.21346E+01 | −5.67640E−02 | 3.41730E−02 | −1.34620E−02 | 3.88530E−03 | −8.60990E−04 | 1.45940E−04 | −1.72260E−05 |
| R11 | −7.03185E+00 | 4.92470E−02 | −6.65400E−02 | 4.21610E−02 | −1.75540E−02 | 4.71780E−03 | −7.23170E−04 | 2.34120E−05 |
| R12 | −4.32149E+00 | 1.48850E−03 | −4.82900E−03 | −4.93380E−03 | 8.34610E−03 | −5.62410E−03 | 2.30820E−03 | −6.41720E−04 |

| | Conic coefficient | Aspheric surface coefficients | | | | | | |
|---|---|---|---|---|---|---|---|---|
| | k | A18 | A20 | A22 | A24 | A26 | A28 | A30 |
| R1 | 1.16674E+01 | −2.85220E−08 | 3.64780E−10 | / | / | / | / | / |
| R2 | −2.89216E−01 | 1.43070E−03 | −9.24290E−05 | / | / | / | / | / |
| R3 | −7.68950E+00 | 7.01000E−03 | −1.05770E−03 | / | / | / | / | / |
| R4 | 8.34496E+00 | 1.26370E−02 | −1.46270E−03 | / | / | / | / | / |
| R5 | / | / | / | / | / | | / | / |
| R6 | / | / | / | / | / | / | / | / |
| R7 | 3.53181E+01 | 9.81600E−06 | 5.14000E−07 | / | / | / | / | / |
| R8 | −3.77715E+00 | −5.44870E−05 | 2.13510E−06 | / | / | / | / | / |
| R9 | −3.77715E+00 | −5.44870E−05 | 2.13510E−06 | / | / | / | / | / |
| R10 | −6.21346E+01 | 1.21350E−06 | −3.76560E−08 | / | / | / | / | / |
| R11 | −7.03185E+00 | 1.35120E−05 | −2.68610E−06 | 1.93328E−07 | 1.78768E−09 | −1.22261E−09 | 7.63165E−11 | −1.61042E−12 |
| R12 | −4.32149E+00 | 1.25790E−04 | −1.76140E−05 | 1.75372E−06 | −1.21345E−07 | 5.54785E−09 | −1.50678E−10 | 1.84044E−12 |

Table 15 and Table 16 show design data of inflexion points and arrest points of each lens of the camera optical lens 40 in the fourth embodiment of the present disclosure.

TABLE 15

| | Number of inflexion points | Inflexion point position 1 | Inflexion point position 2 | Inflexion point position 3 |
|---|---|---|---|---|
| P1R1 | 2 | 1.355 | 1.935 | / |
| P1R2 | 1 | 1.615 | / | / |
| P2R1 | 1 | 1.385 | / | / |
| P2R2 | / | / | / | / |
| P3R1 | / | / | / | / |
| P3R2 | / | / | / | / |
| P4R1 | 1 | 1.815 | / | / |
| P4R2 | 1 | 1.835 | / | / |
| P5R1 | 1 | 1.835 | / | / |
| P5R2 | 3 | 0.465 | 1.685 | 2.645 |
| P6R1 | 3 | 0.975 | 2.485 | 3.025 |
| P6R2 | 1 | 1.155 | / | / |

TABLE 16

| | Number of arrest points | Arrest point position 1 | Arrest point position 2 |
|---|---|---|---|
| P1R1 | / | / | / |
| P1R2 | / | / | / |
| P2R1 | / | / | / |
| P2R2 | / | / | / |

TABLE 16-continued

| | Number of arrest points | Arrest point position 1 | Arrest point position 2 |
|---|---|---|---|
| P3R1 | / | / | / |
| P3R2 | / | / | / |
| P4R1 | 1 | 2.145 | / |
| P4R2 | 1 | 2.205 | / |
| P5R1 | 1 | 2.205 | / |
| P5R2 | 2 | 1.065 | 2.045 |
| P6R1 | 1 | 1.945 | / |
| P6R2 | 1 | 1.965 | |

In addition, in the following table 25, values corresponding to parameters specified in the conditions and various parameters in the fourth embodiment are listed.

Figure 14:
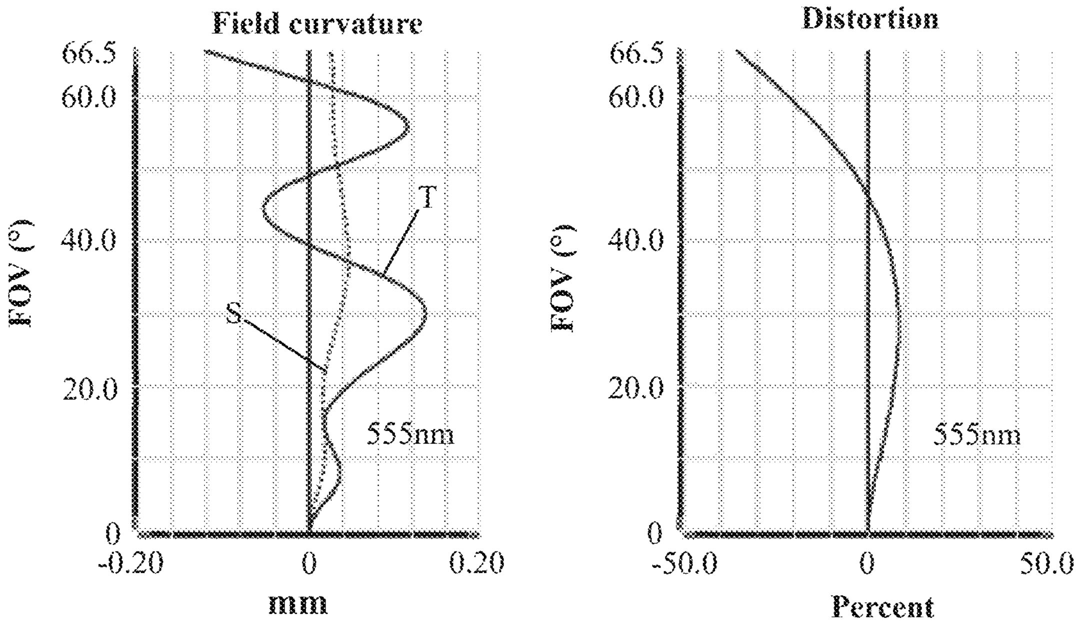
FIG. 14 is a schematic diagram of a field curvature and a distortion of the camera optical lens shown in FIG. 13.
Figure 15:
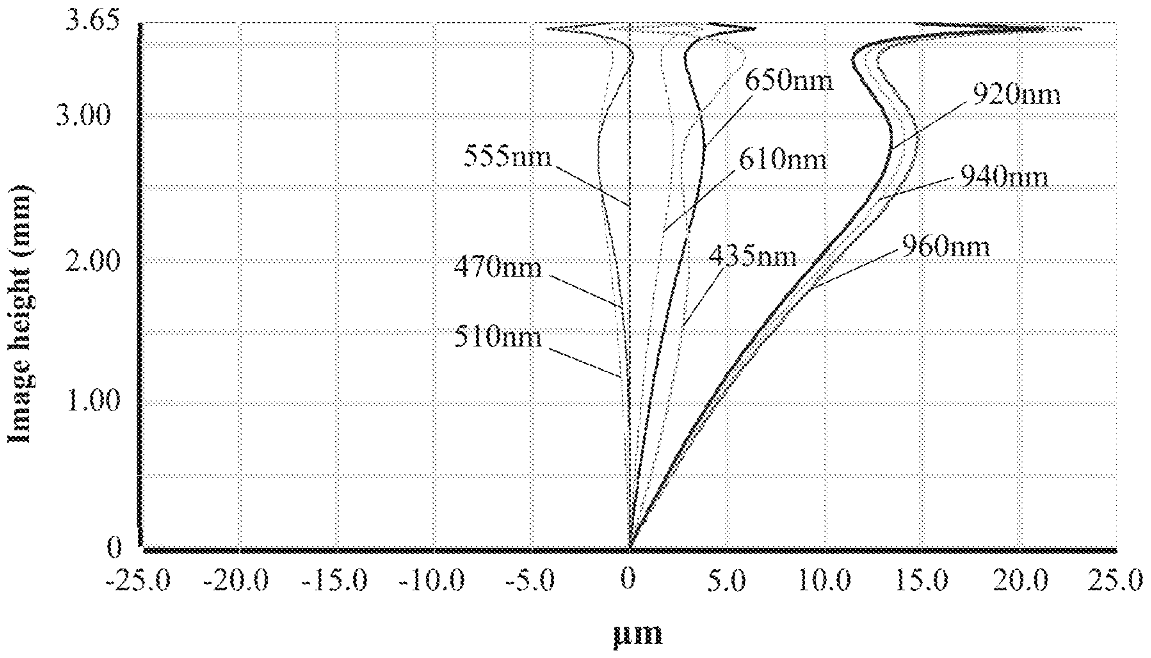
FIG. 15 is a schematic diagram of a lateral color of the camera optical lens shown in FIG. 13.
Figure 16:
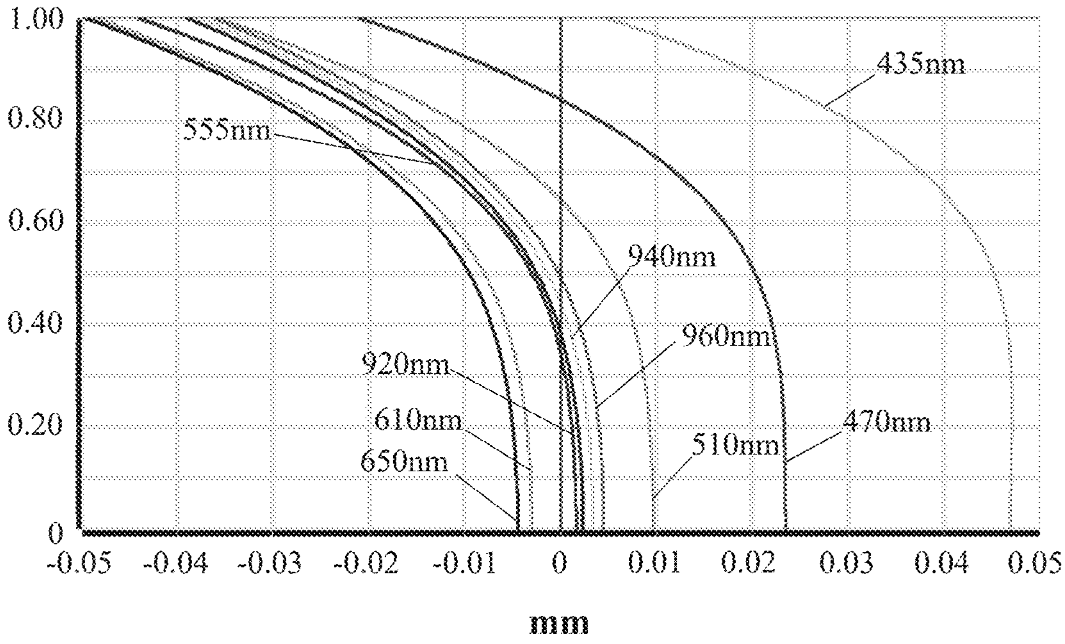
FIG. 16 is a schematic diagram of a longitudinal aberration of the camera optical lens shown in FIG. 13.

FIG. 14 shows a field curvature and a distortion after light with a wavelength of 555 nm passes through the camera optical lens 40 in the fourth embodiment. FIG. 15 is a schematic diagram illustrating lateral colors after light with wavelengths of 435 nm, 470 nm, 510 nm, 555 nm, 610 nm, 650 nm, 920 nm, 940 nm and 960 nm passes through the camera optical lens 40 in the fourth embodiment. FIG. 16 is a schematic diagram illustrating longitudinal aberrations after light with wavelengths of 435 nm, 470 nm, 510 nm, 555 nm, 610 nm, 650 nm, 920 nm, 940 nm and 960 nm passes through the camera optical lens 40 in the fourth embodiment.

As shown in Table 25, the fourth embodiment satisfies the various conditions.

In this embodiment, the entrance pupil diameter of the camera optical lens 40 is 1.049 mm, the full vision field image height is 3.648 mm, and the field of view (FOV) in a diagonal direction is 133.03°. Thus, the camera optical lens 40 meets the design requirements for large aperture, ultra-wide angle and ultra-thinness, and the on-axis and off-axis aberrations are sufficiently corrected, thereby achieving excellent optical performance.

Fifth Embodiment

Figure 17:
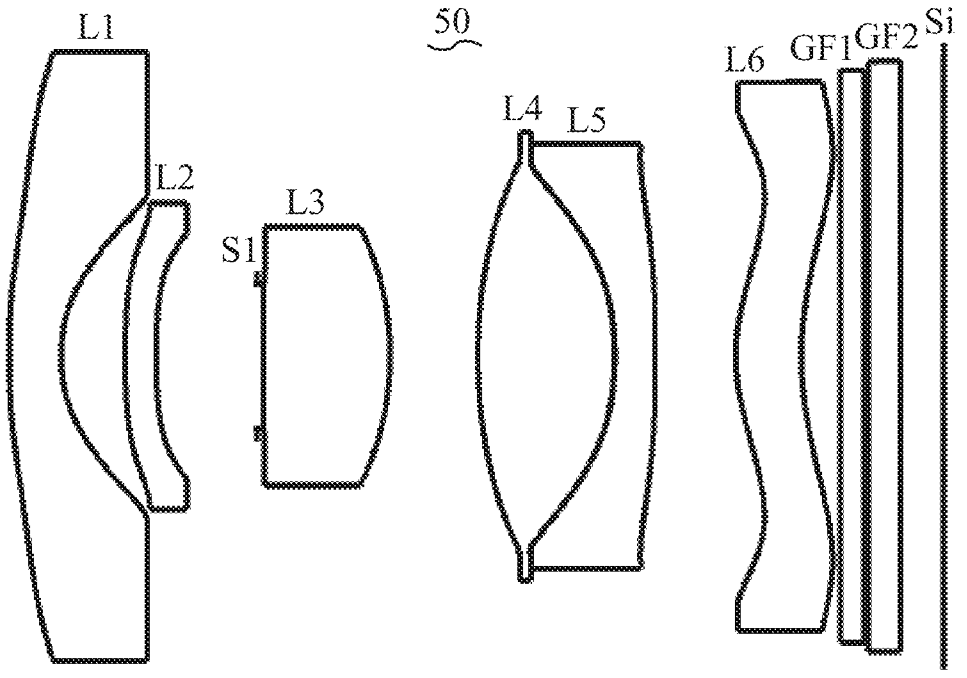
FIG. 17 is a schematic structural diagram of a camera optical lens according to a fifth embodiment of the present disclosure.

FIG. 17 is a schematic structural diagram of the camera optical lens 50 according to the fifth embodiment. The fifth embodiment is substantially the same as the first embodiment, and the meanings of the symbols in the fifth embodiment are the same as the meanings of the symbols in the first embodiment. In the following, only differences are described.

Table 17 and Table 18 show design data of the camera optical lens 40 in the fifth embodiment of the present disclosure.

TABLE 17

| | R | d | | nd | | vd | |
|---|---|---|---|---|---|---|---|
| S1 | ∞ | d0= | −3.116 | | | | |
| R1 | 14.560 | d1= | 0.647 | nd1 | 1.5362 | vd1 | 55.62 |
| R2 | 1.776 | d2= | 0.806 | | | | |
| R3 | 12.541 | d3= | 0.390 | nd2 | 1.6613 | vd2 | 20.37 |
| R4 | 8.575 | d4= | 1.345 | | | | |
| R5 | 36.471 | d5= | 1.597 | nd3 | 1.7292 | vd3 | 54.67 |
| R6 | −3.143 | d6= | 1.102 | | | | |
| R7 | 5.415 | d7= | 1.516 | nd4 | 1.5362 | vd4 | 55.62 |
| R8 | −3.753 | d8= | 0.005 | | | | |
| R9 | −3.753 | d9= | 0.506 | nd5 | 1.6613 | vd5 | 20.37 |
| R10 | 79.710 | d10= | 1.014 | | | | |
| R11 | 2.032 | d11= | 0.825 | nd6 | 1.5362 | vd6 | 55.62 |
| R12 | 3.587 | d12= | 0.494 | | | | |
| R13 | ∞ | d13= | 0.300 | ndg1 | 1.5168 | vg1 | 64.17 |
| R14 | ∞ | d14= | 0.049 | | | | |
| R15 | ∞ | d15= | 0.400 | ndg2 | 1.5168 | vg2 | 64.17 |
| R16 | ∞ | d16= | 0.545 | | | | |

TABLE 18

| | Conic coefficient | Aspheric surface coefficients | | | | | | |
|---|---|---|---|---|---|---|---|---|
| | k | A4 | A6 | A8 | A10 | A12 | A14 | A16 |
| R1 | 1.21843E+01 | 4.95380E−02 | −3.18340E−02 | 9.95450E−03 | −1.89990E−03 | 2.35370E−04 | −1.90530E−05 | 9.73720E−07 |
| R2 | −3.71834E−01 | 8.48130E−02 | −1.51790E−02 | −8.69130E−02 | 1.04990E−01 | −7.13550E−02 | 3.22760E−02 | −9.16740E−03 |
| R3 | −1.16012E+01 | 6.68580E−02 | −1.07400E−02 | −4.77810E−02 | 8.90830E−02 | −8.83230E−02 | 5.82490E−02 | −2.56460E−02 |
| R4 | 3.87118E+00 | 6.48720E−02 | 1.20990E−02 | −7.43850E−02 | 1.43550E−01 | −1.48890E−01 | 1.01750E−01 | −4.67490E−02 |
| R5 | / | / | / | / | / | / | / | / |
| R6 | / | / | / | / | / | / | / | / |
| R7 | −2.34985E+01 | 1.56640E−02 | −3.27550E−03 | 1.26330E−04 | 1.02950E−03 | −8.48020E−04 | 3.45710E−04 | −7.94460E−05 |
| R8 | −2.70690E+00 | −1.01960E−01 | 4.82700E−02 | 4.48490E−03 | −2.06850E−02 | 1.21460E−02 | −3.59020E−03 | 5.99620E−04 |
| R9 | −2.70690E+00 | −1.01960E−01 | 4.82700E−02 | 4.48490E−03 | −2.06850E−02 | 1.21460E−02 | −3.59020E−03 | 5.99620E−04 |
| R10 | −4.45038E+01 | −5.75120E−02 | 3.41630E−02 | −1.34550E−02 | 3.88630E−03 | −8.61150E−04 | 1.45940E−04 | −1.72260E−05 |
| R11 | −8.74489E+00 | 4.88390E−02 | −6.65970E−02 | 4.21590E−02 | −1.75540E−02 | 4.71790E−03 | −7.23170E−04 | 2.34120E−05 |
| R12 | −4.32902E+00 | 2.14110E−03 | −4.71780E−03 | −4.92610E−03 | 8.34610E−03 | −5.62420E−03 | 2.30820E−03 | −6.41720E−04 |

| | Conic coefficient | Aspheric surface coefficients | | | | | | |
|---|---|---|---|---|---|---|---|---|
| | k | A18 | A20 | A22 | A24 | A26 | A28 | A30 |
| R1 | 1.21843E+01 | −2.85230E−08 | 3.64840E−10 | / | / | / | / | / |
| R2 | −3.71834E−01 | 1.43060E−03 | −9.23670E−05 | / | / | / | / | / |
| R3 | −1.16012E+01 | 7.00990E−03 | −1.05770E−03 | / | / | / | / | / |
| R4 | 3.87118E+00 | 1.26400E−02 | −1.46250E−03 | / | / | / | / | / |
| R5 | / | / | / | / | / | | / | / |
| R6 | / | / | / | / | / | / | / | / |
| R7 | −2.34985E+01 | 9.82930E−06 | −5.09620E−07 | / | / | / | / | / |
| R8 | −2.70690E+00 | −5.45080E−05 | 2.13280E−06 | / | / | / | / | / |
| R9 | −2.70690E+00 | −5.45080E−05 | 2.13280E−06 | / | / | / | / | / |
| R10 | −4.45038E+01 | 1.21360E−06 | −3.76530E−08 | / | / | / | / | / |
| R11 | −8.74489E+00 | 1.35120E−05 | −2.68610E−06 | 1.93330E−07 | 1.78760E−09 | −1.22260E−09 | 7.63170E−11 | −1.61020E−12 |
| R12 | −4.32902E+00 | 1.25790E−04 | −1.76140E−05 | 1.75370E−06 | −1.21350E−07 | 5.54780E−09 | −1.50680E−10 | 1.84040E−12 |

Table 19 and Table 20 show design data of inflexion points and arrest points of each lens of the camera optical lens 50 in the fifth embodiment of the present disclosure.

TABLE 19

| | Number of inflexion points | Inflexion point position 1 | Inflexion point position 2 | Inflexion point position 3 | Inflexion point position 4 | Inflexion point position 5 |
|---|---|---|---|---|---|---|
| P1R1 | 2 | 1.335 | 1.955 | / | / | / |
| P1R2 | 1 | 1.575 | / | / | / | / |
| P2R1 | 1 | 1.385 | / | / | / | / |
| P2R2 | / | / | / | / | / | / |
| P3R1 | / | / | / | / | / | / |
| P3R2 | / | / | / | / | / | / |
| P4R1 | 1 | 2.145 | / | / | / | / |
| P4R2 | 1 | 1.985 | / | / | / | / |
| P5R1 | 1 | 1.985 | / | / | / | / |
| P5R2 | 2 | 0.145 | 1.725 | / | / | / |
| P6R1 | 5 | 0.965 | 2.535 | 2.965 | 3.015 | 3.115 |
| P6R2 | 1 | 1.405 | / | / | / | / |

TABLE 20

| | Number of arrest points | Arrest point position 1 | Arrest point position 2 |
|---|---|---|---|
| P1R1 | / | / | / |
| P1R2 | / | / | / |
| P2R1 | / | / | / |
| P2R2 | / | / | / |
| P3R1 | / | / | / |
| P3R2 | / | / | / |
| P4R1 | 1 | 2.315 | / |
| P4R2 | 1 | 2.265 | / |
| P5R1 | 1 | 2.265 | / |
| P5R2 | 2 | 0.235 | 2.315 |
| P6R1 | 1 | 1.855 | / |
| P6R2 | 1 | 2.355 | / |

In addition, in the following table 25, values corresponding to parameters specified in the conditions and various parameters in the fifth embodiment are listed.

Figure 18:
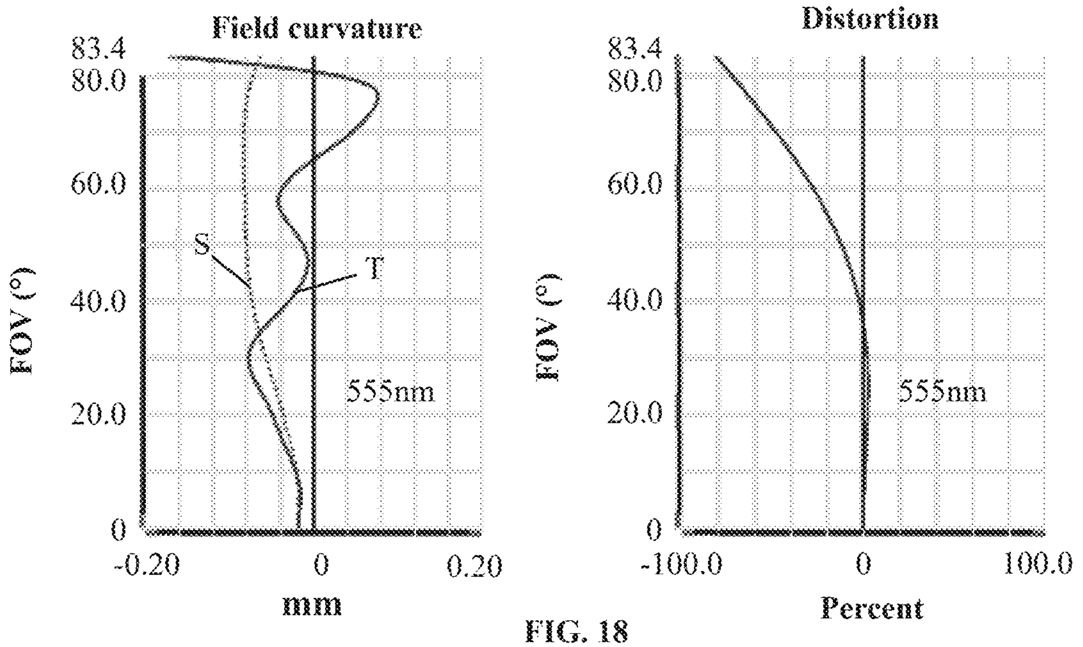
FIG. 18 is a schematic diagram of a field curvature and a distortion of the camera optical lens shown in FIG. 17.
Figure 19:
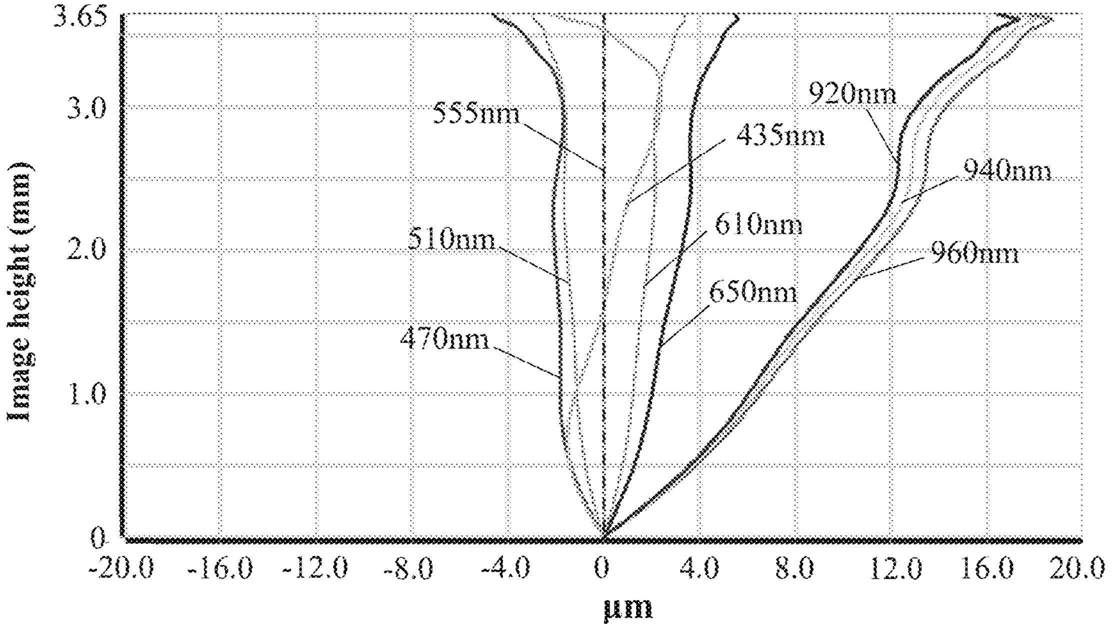
FIG. 19 is a schematic diagram of a lateral color of the camera optical lens shown in FIG. 17.
Figure 20:
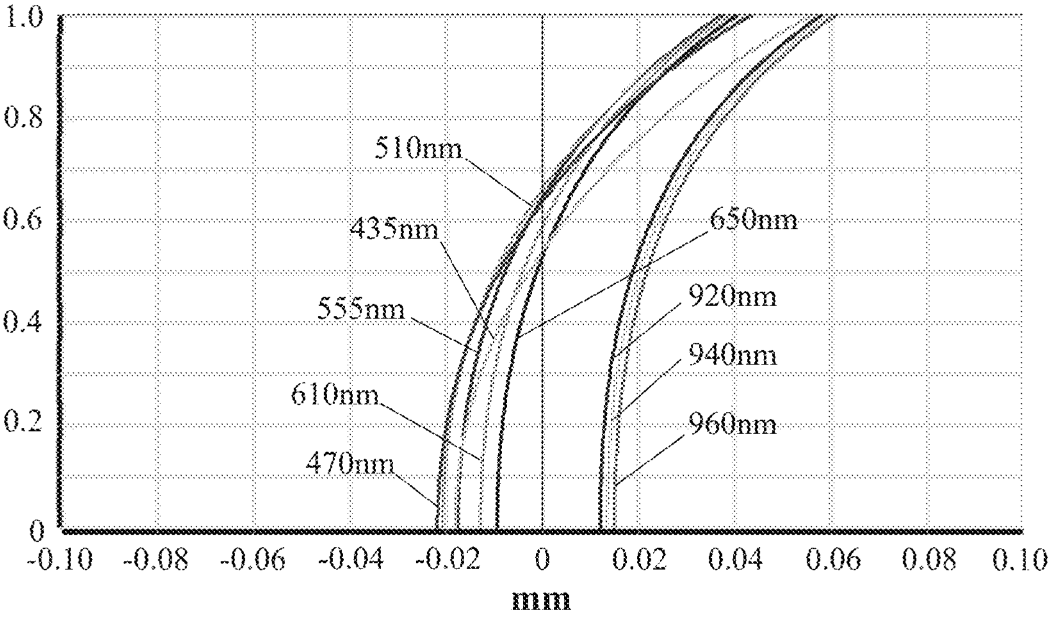
FIG. 20 is a schematic diagram of a longitudinal aberration of the camera optical lens shown in FIG. 17.

FIG. 18 shows a field curvature and a distortion after light with a wavelength of 555 nm passes through the camera optical lens 50 in the fifth embodiment. FIG. 19 is a schematic diagram illustrating lateral colors after light with wavelengths of 435 nm, 470 nm, 510 nm, 555 nm, 610 nm, 650 nm, 920 nm, 940 nm and 960 nm passes through the camera optical lens 50 in the fifth embodiment. FIG. 20 is a schematic diagram illustrating longitudinal aberrations after light with wavelengths of 435 nm, 470 nm, 510 nm, 555 nm, 610 nm, 650 nm, 920 nm, 940 nm and 960 nm passes through the camera optical lens 50 in the fifth embodiment.

As shown in Table 25, the fifth embodiment satisfies the various conditions.

In this embodiment, the entrance pupil diameter of the camera optical lens 50 is 1.004 mm, the full vision field image height is 3.648 mm, and the field of view (FOV) in a diagonal direction is 166.80°. Thus, the camera optical lens 50 meets the design requirements for large aperture, ultra-wide angle and ultra-thinness, and the on-axis and off-axis aberrations are sufficiently corrected, thereby achieving excellent optical performance.

Comparative Embodiment

Figure 21:
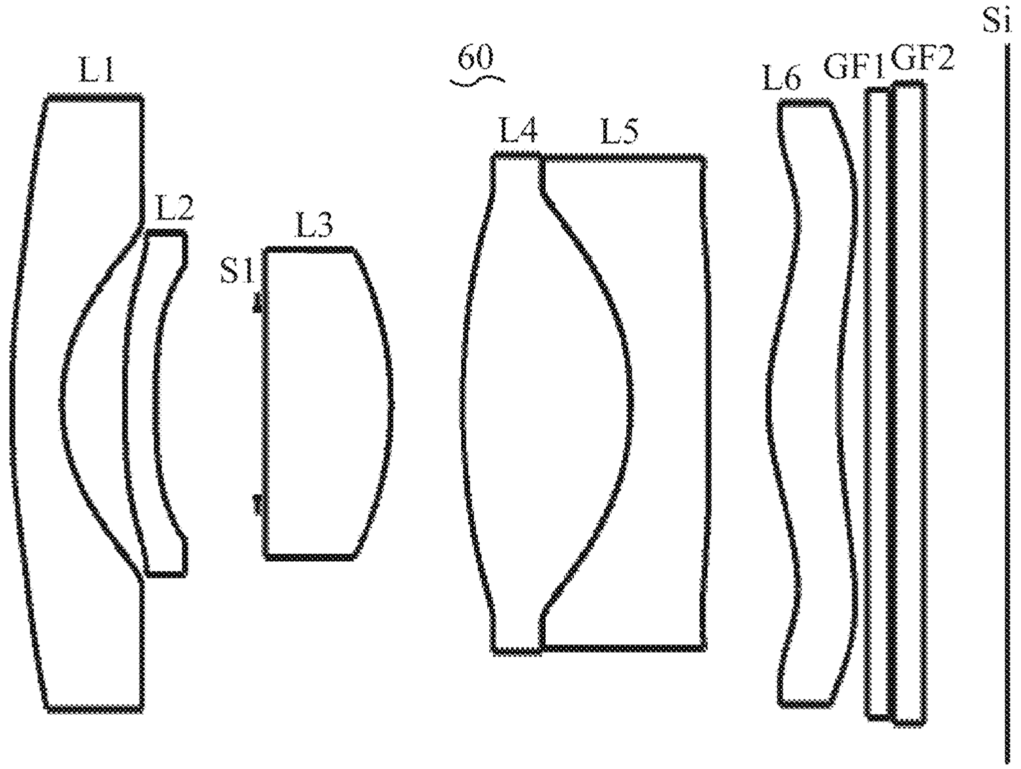
FIG. 21 is a schematic diagram of the structure of a camera optical lens according to a comparative embodiment.

FIG. 21 is a schematic structural diagram of the camera optical lens 60 according to the comparative embodiment. The meanings of the symbols in the comparative embodiment are the same as the meanings of the symbols in the first embodiment. In the following, only differences are described.

Table 21 and Table 22 show design data of the camera optical lens 60 in the comparative embodiment of the present disclosure.

TABLE 21

| | R | | d | | nd | | vd |
|---|---|---|---|---|---|---|---|
| S1 | ∞ | d0= | −3.259 | | | | |
| R1 | 14.185 | d1= | 0.669 | nd1 | 1.5362 | vd1 | 55.62 |
| R2 | 1.780 | d2= | 0.831 | | | | |
| R3 | 14.292 | d3= | 0.413 | nd2 | 1.6613 | vd2 | 20.37 |
| R4 | 9.076 | d4= | 1.450 | | | | |
| R5 | 175.132 | d5= | 1.668 | nd3 | 1.6610 | vd3 | 20.53 |
| R6 | −2.883 | d6= | 0.955 | | | | |
| R7 | 6.477 | d7= | 2.225 | nd4 | 1.5362 | vd4 | 55.62 |
| R8 | −2.653 | d8= | 0.005 | | | | |
| R9 | −2.653 | d9= | 1.024 | nd5 | 1.6613 | vd5 | 20.37 |
| R10 | 10.516 | d10= | 0.800 | | | | |
| R11 | 1.949 | d11= | 0.936 | nd6 | 1.5362 | vd6 | 55.62 |
| R12 | 5.140 | d12= | 0.383 | | | | |
| R13 | ∞ | d13= | 0.300 | ndg1 | 1.5168 | vg1 | 64.17 |
| R14 | ∞ | d14= | 0.049 | | | | |
| R15 | ∞ | d15= | 0.400 | ndg2 | 1.5168 | vg2 | 64.17 |
| R16 | ∞ | d16= | 1.113 | | | | |

TABLE 22

| | Conic coefficient | Aspheric surface coefficients | | | | | | |
|---|---|---|---|---|---|---|---|---|
| | k | A4 | A6 | A8 | A10 | A12 | A14 | A16 |
| R1 | 1.21971E+01 | 4.97870E−02 | −3.18450E−02 | 9.95410E−03 | −1.89990E−03 | 2.35370E−04 | −1.90540E−05 | 9.73710E−07 |
| R2 | −3.78179E−01 | 8.41610E−02 | −1.54540E−02 | −8.69560E−02 | 1.04990E−01 | −7.13570E−02 | 3.22770E−02 | −9.16740E−03 |
| R3 | −2.31875E+01 | 6.64250E−02 | −1.07680E−02 | −4.78030E−02 | 8.90750E−02 | −8.83250E−02 | 5.82480E−02 | −2.56460E−02 |
| R4 | 5.83671E+00 | 6.54410E−02 | 1.15390E−02 | −7.42230E−02 | 1.43350E−01 | −1.49010E−01 | 1.01760E−01 | −4.67450E−02 |

TABLE 22-continued

| | | | | | | | | |
|---|---|---|---|---|---|---|---|---|
| R5 | / | / | / | / | / | / | / | / |
| R6 | / | / | / | / | / | / | / | / |
| R7 | −2.98016E+01 | 1.44230E−02 | −3.45170E−03 | 1.20960E−04 | 1.03170E−03 | −8.47510E−04 | 3.45730E−04 | −7.94610E−05 |
| R8 | −3.13767E+00 | −1.00940E−01 | 4.83080E−02 | 4.48680E−03 | −2.06840E−02 | 1.21460E−02 | −3.59020E−03 | 5.99620E−04 |
| R9 | −3.13767E+00 | −1.00940E−01 | 4.83080E−02 | 4.48680E−03 | −2.06840E−02 | 1.21460E−02 | −3.59020E−03 | 5.99620E−04 |
| R10 | −8.80311E+01 | −5.77890E−02 | 3.41480E−02 | −1.34560E−02 | 3.88610E−03 | −8.61150E−04 | 1.45940E−04 | −1.72260E−05 |
| R11 | −8.23550E+00 | 4.95880E−02 | −6.65310E−02 | 4.21620E−02 | −1.75540E−02 | 4.71790E−03 | −7.23170E−04 | 2.34120E−05 |
| R12 | −5.78626E+00 | 1.31300E−03 | −4.79140E−03 | −4.92940E−03 | 8.34610E−03 | −5.62410E−03 | 2.30820E−03 | −6.41720E−04 |

| | Conic coefficient | Aspheric surface coefficients | | | | | | |
|---|---|---|---|---|---|---|---|---|
| | k | A18 | A20 | A22 | A24 | A26 | A28 | A30 |
| R1 | 1.21971E+01 | −2.85250E−08 | 3.64710E−10 | / | / | / | / | / |
| R2 | −3.78179E−01 | 1.43060E−03 | −9.23710E−05 | / | / | / | / | / |
| R3 | −2.31875E+01 | 7.01000E−03 | −1.05770E−03 | / | / | / | / | / |
| R4 | 5.83671E+00 | 1.26470E−02 | −1.46210E−03 | / | / | / | / | / |
| R5 | / | / | / | / | / | | / | / |
| R6 | / | / | / | / | / | / | / | / |
| R7 | −2.98016E+01 | 9.82330E−06 | −5.11270E−07 | / | / | / | / | / |
| R8 | −3.13767E+00 | −5.45090E−05 | 2.13230E−06 | / | / | / | / | / |
| R9 | −3.13767E+00 | −5.45090E−05 | 2.13230E−06 | / | / | / | / | / |
| R10 | −8.80311E+01 | 1.21350E−06 | −3.76580E−08 | / | / | / | / | / |
| R11 | −8.23550E+00 | 1.35120E−05 | −2.68610E−06 | 1.93330E−07 | 1.78770E−09 | −1.22260E−09 | 7.63170E−11 | −1.61040E−12 |
| R12 | −5.78626E+00 | 1.25790E−04 | −1.76140E−05 | 1.75370E−06 | −1.21350E−07 | 5.54780E−09 | −1.50680E−10 | 1.84040E−12 |

Table 23 and Table 24 show design data of inflexion points and arrest points of each lens of the camera optical lens 60 in the comparative embodiment.

TABLE 23

| | Number of inflexion points | Inflexion point position 1 | Inflexion point position 2 | Inflexion point position 3 | Inflexion point position 4 | Inflexion point position 5 |
|---|---|---|---|---|---|---|
| P1R1 | 3 | 1.335 | 1.905 | 3.195 | / | / |
| P1R2 | 1 | 1.555 | / | / | / | / |
| P2R1 | 1 | 1.375 | / | / | / | / |
| P2R2 | / | / | / | / | / | / |
| P3R1 | / | / | / | / | / | / |
| P3R2 | / | / | / | / | / | / |
| P4R1 | 1 | 2.025 | / | / | / | / |
| P4R2 | 1 | 1.985 | / | / | / | / |
| P5R1 | 1 | 1.985 | / | / | / | / |
| P5R2 | 3 | 0.385 | 1.755 | 2.615 | / | / |
| P6R1 | 3 | 0.985 | 2.465 | 3.065 | / | / |
| P6R2 | 3 | 1.205 | 2.935 | 3.265 | / | / |

TABLE 24

| | Number of arrest points | Arrest point position 1 | Arrest point position 2 | Arrest point position 3 |
|---|---|---|---|---|
| P1R1 | / | / | / | / |
| P1R2 | / | / | / | / |
| P2R1 | / | / | / | / |
| P2R2 | / | / | / | / |
| P3R1 | / | / | / | / |
| P3R2 | / | / | / | / |
| P4R1 | / | / | / | / |
| P4R2 | 1 | 2.275 | / | / |
| P5R1 | 1 | 2.275 | / | / |
| P5R2 | 2 | 0.735 | 2.235 | / |
| P6R1 | 3 | 1.915 | 2.985 | 3.105 |
| P6R2 | 1 | 2.065 | / | / |

Figure 22:
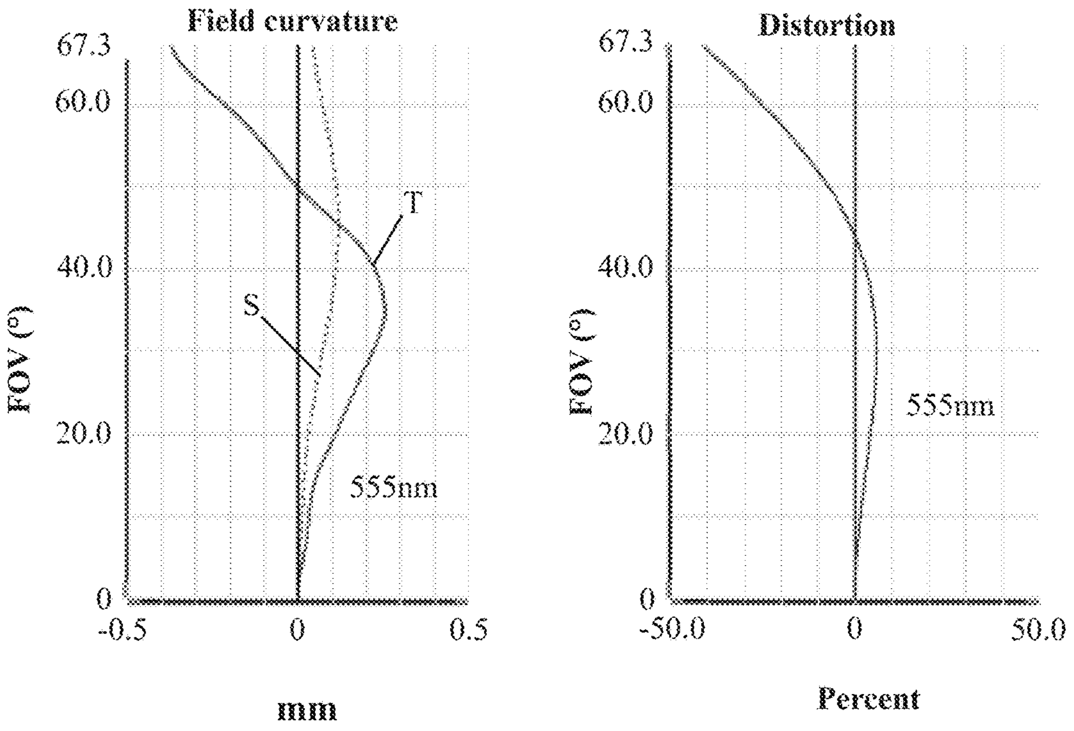
FIG. 22 is a schematic diagram of a field curvature and a distortion of the camera optical lens shown in FIG. 21.
Figure 23:
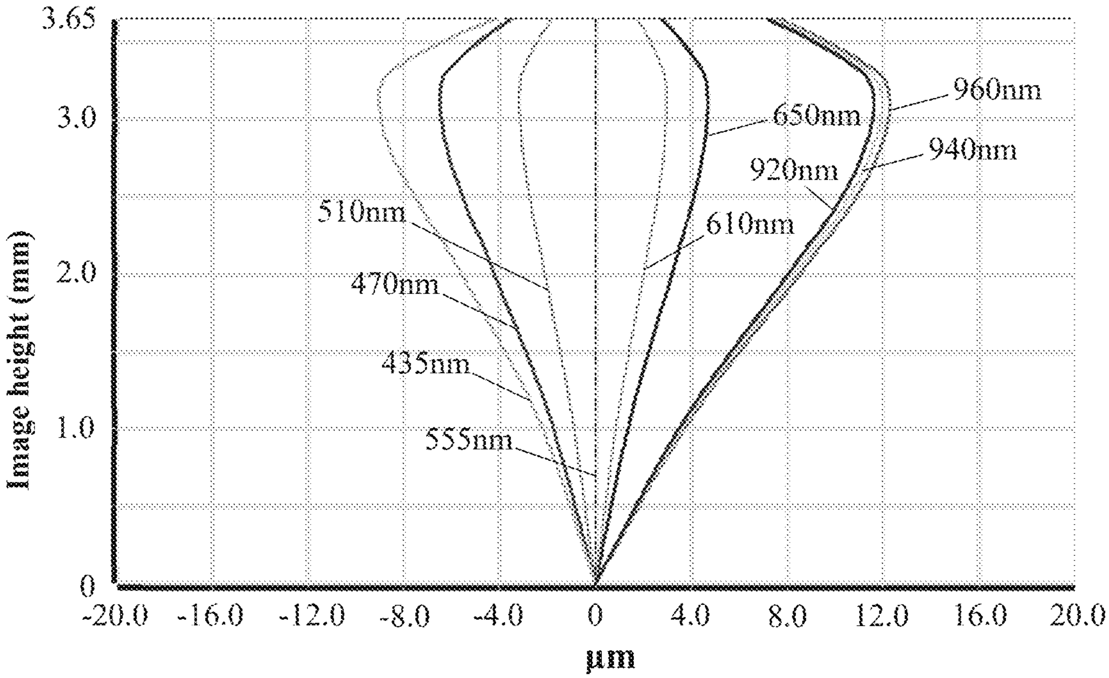
FIG. 23 is a schematic diagram of a lateral color of the camera optical lens shown in FIG. 21.
Figure 24:
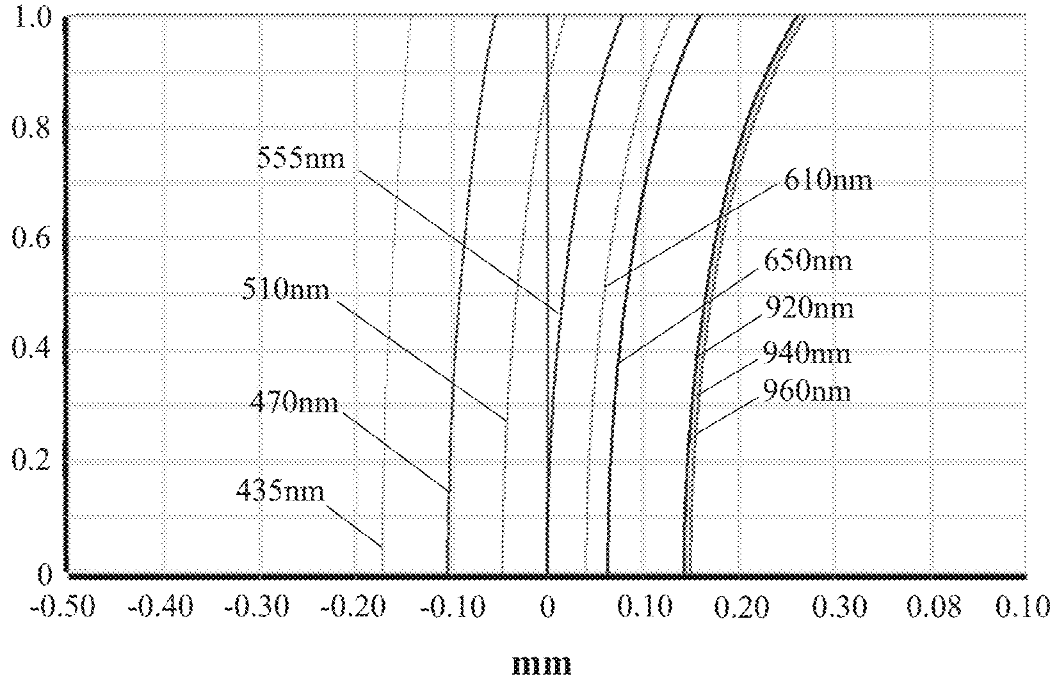
FIG. 24 is a schematic diagram of a longitudinal aberration of the camera optical lens shown in FIG. 21.

FIG. 22 shows a field curvature and a distortion after light with a wavelength of 555 nm passes through the camera optical lens 60 in the comparative embodiment. FIG. 23 is a schematic diagram illustrating lateral colors after light with wavelengths of 435 nm, 470 nm, 510 nm, 555 nm, 610 nm, 650 nm, 920 nm, 940 nm and 960 nm passes through the camera optical lens 60 in the comparative embodiment. FIG. 24 is a schematic diagram illustrating longitudinal aberrations after light with wavelengths of 435 nm, 470 nm, 510 nm, 555 nm, 610 nm, 650 nm, 920 nm, 940 nm and 960 nm passes through the camera optical lens 60 in the comparative embodiment.

In this embodiment, the entrance pupil diameter of the camera optical lens 60 is 1.147 mm, the full vision field image height is 3.648 mm, and the field of view (FOV) in a diagonal direction is 134.60°.

Table 25 lists values corresponding to various conditions in the comparative embodiment according to the above conditions. Apparently, the camera optical lens 60 in the comparative embodiment does not satisfy the above condition: nd3>1.70.

In the comparative embodiment, the entrance pupil diameter of the camera optical lens 60 is 1.147 mm, the full vision field image height is 3.648 mm, and the field of view (FOV) in a diagonal direction is 134.60°. The camera optical lens 60 does not have excellent optical characteristics, and the on-axis and off-axis aberrations are not sufficiently corrected.

TABLE 25

| Parameters and conditional equations | First embodiment | Second embodiment | Third embodiment | Fourth embodiment | Fifth embodiment | Comparative embodiment |
|---|---|---|---|---|---|---|
| f1/f | −1.555 | −1.550 | −1.401 | −1.692 | −1.687 | −1.487 |
| BF/TTL | 0.145 | 0.169 | 0.151 | 0.111 | 0.155 | 0.169 |
| (R3 + R4)/(R3 − R4) | 4.230 | 3.203 | 46.013 | 2.955 | 5.324 | 4.480 |
| nd3 | 1.729 | 1.729 | 1.724 | 1.729 | 1.729 | 1.661 |
| f4/f5 | −1.241 | −1.231 | −1.232 | −1.597 | −0.816 | −1.242 |
| d11/d10 | 1.190 | 1.163 | 1.110 | 1.598 | 0.813 | 1.169 |
| f | 2.466 | 2.464 | 2.661 | 2.371 | 2.269 | 2.594 |
| f1 | −3.834 | −3.819 | −3.728 | −4.012 | −3.828 | −3.856 |
| f2 | −35.935 | −26.871 | −467.012 | −24.024 | −42.318 | −38.498 |
| f3 | 3.905 | 3.918 | 3.968 | 3.846 | 4.023 | 4.27 |
| f4 | 3.828 | 3.877 | 3.941 | 3.978 | 4.373 | 3.825 |
| f5 | −3.084 | −3.15 | −3.2 | −2.49 | −5.36 | −3.08 |
| f6 | 5.348 | 5.354 | 5.716 | 3.61 | 7.352 | 5.293 |
| FNO | 2.26 | 2.26 | 2.26 | 2.26 | 2.26 | 2.73 |

It will be understood by those skilled in the art that the embodiments described above are specific embodiments realizing the present disclosure. In practice, various changes may be made to these embodiments in form and in detail without departing from the spirit and scope of the disclosure.

What is claimed is:

1. A camera optical lens, comprising in sequence from an object side to an image side: a first lens having a negative refractive power, a second lens, a third lens, a fourth lens, a fifth lens, and a sixth lens;

wherein the camera optical lens satisfies the following conditions:

$$-1.70 \leq f1/f \leq -1.40;$$

$$0.11 \leq BF/TTL \leq 0.17;$$

$$(R3 + R4)/(R3 - R4) \geq 2.90;$$

$$-1.60 \leq f4/f5 \leq 0.80; \text{ and}$$

$$nd3 \geq 1.70;$$

wherein:

f represents a focal length of the camera optical lens;

f1 represents a focal length of the first lens;

TTL represents a total track length of the camera optical lens;

BF represents a back focal length of the camera optical lens;

R3 represents a curvature radius of an object-side surface of the second lens;

R4 represents a curvature radius of an image-side surface of the second lens;

f4 represents a focal length of the fourth lens;

f5 represents a focal length of the fifth lens; and nd3 represents a refractive index of the third lens.

2. The camera optical lens of claim 1, wherein the camera optical lens further satisfies the following condition:

$$0.80 \leq d11/d10 \leq 1.60;$$

wherein:

d10 represents an on-axis distance from an image-side surface of the fifth lens to an object-side surface of the six lens, and d11 represents an on-axis thickness of the six lens.

3. The camera optical lens of claim 1, wherein the camera optical lens further satisfies the following condition:

$$2.90 \leq (R3 + R4)/(R3 - R4) \leq 50.00.$$

4. The camera optical lens of claim 1, wherein an object-side surface of the first lens is convex in a paraxial region, and an image-side surface of the first lens is concave in the paraxial region, and the camera optical lens further satisfies the following condition:

$$0.60 \leq (R1 + R2)/(R1 - R2) \leq 2.00; \text{ and}$$

$$0.01 \leq d1/TTL \leq 1.00;$$

wherein:

R1 represents a curvature radius of an object-side surface of the first lens;

R2 represents a curvature radius of an image-side surface of the first lens; and d1 represents an on-axis thickness of the first lens.

5. The camera optical lens of claim 1, wherein the second lens has a negative refractive power, an object-side surface of the second lens is convex in a paraxial region, and an image-side surface of the second lens is concave in the paraxial region;

wherein the camera optical lens further satisfy the following condition:

$$-352.00 \leq f2/f \leq -7.00; \text{ and}$$

$$0.01 \leq d3/TTL \leq 0.06;$$

wherein:

f2 represents a focal length of the second lens; and d3 represents an on-axis thickness of the second lens.

6. The camera optical lens of claim 1, wherein the third lens has a positive refractive power, an object-side surface of the third lens is convex in a paraxial region, and an image-side surface of the third lens is convex in the paraxial region, wherein the camera optical lens further satisfies the following conditions;

$$0.40 \le (R5 + R6)/(R5 - R6) \le 1.50;$$

$$0.75 \le f3/f \le 2.70; \text{ and}$$

$$0.05 \le d5/TTL \le 0.22;$$

wherein:

RS represents a curvature radius of the object-side surface of the third lens;

R6 represents a curvature radius of the image-side surface of the third lens;

f3 represents a focal length of the third lens; and d5 represents an on-axis thickness of the third lens.

7. The camera optical lens of claim 1, wherein the fourth lens has a positive refractive power, an object-side surface of the fourth lens is convex in a paraxial region, and an image-side surface of the fourth lens is convex in the paraxial region;

wherein the camera optical lens further satisfies the following conditions:

$$0.07 \le (R7 + R8)/(R7 - R8) \le 0.70;$$

$$0.07 \le f4/f \le 3.00; \text{ and}$$

$$0.05 \le d7/TTL \le 0.30;$$

wherein:

R7 represents a curvature radius of the object-side surface of the fourth lens;

R8 represents a curvature radius of the image-side surface of the fourth lens;

and d7 represents an on-axis thickness of the fourth lens.

8. The camera optical lens of claim 1, wherein the fifth lens has a negative refractive power, an object-side surface of the fifth lens is concave in a paraxial region, and an image-side surface of the fifth lens is concave in the paraxial region;

wherein the camera optical lens further satisfies the following conditions:

$$-2.00 \le (R9 + R10)/(R9 - R10) \le -0.20;$$

$$-5.00 \le f5/f \le -0.50; \text{ and}$$

$$0.01 \le d9/TTL \le 0.20;$$

wherein:

R9 represents a curvature radius of the object-side surface of the fifth lens;

R10 represents a curvature radius of the image-side surface of the fifth lens;

and d9 represents an on-axis thickness of the fifth lens.

9. The camera optical lens of claim 1, wherein the sixth lens has a positive refractive power, an object-side surface of the sixth lens is convex in a paraxial region, and an image-side surface of the sixth lens is concave in the paraxial region;

wherein the camera optical lens further satisfies the following conditions:

$$-7.50 \le (R11 + R12)/(R11 - R12) \le -1.00;$$

$$0.60 \le f6/f \le 5.00; \text{ and}$$

$$0.01 \le d11/TTL \le 0.15;$$

wherein:

R11 represents a curvature radius of the object-side surface of the sixth lens;

R12 represents a curvature radius of the image-side surface of the sixth lens;

f6 represents a focal length of the sixth lens; and d11 represents an on-axis thickness of the sixth lens.

10. The camera optical lens of claim 1, wherein the third lens is made of glass.

* * * * *